(12) United States Patent
Ozone et al.

(10) Patent No.: US 11,902,660 B2
(45) Date of Patent: Feb. 13, 2024

(54) IMAGE PROCESSING DEVICE, IMAGE PROCESSING METHOD, AND PROGRAM

(71) Applicant: SONY GROUP CORPORATION, Tokyo (JP)

(72) Inventors: Takayoshi Ozone, Tokyo (JP); Ryuichi Tadano, Tokyo (JP); Hiroshi Yamamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 264 days.

(21) Appl. No.: 17/310,572

(22) PCT Filed: Dec. 26, 2019

(86) PCT No.: PCT/JP2019/051278
§ 371 (c)(1),
(2) Date: Aug. 11, 2021

(87) PCT Pub. No.: WO2020/170606
PCT Pub. Date: Aug. 27, 2020

(65) Prior Publication Data
US 2022/0038629 A1 Feb. 3, 2022

(30) Foreign Application Priority Data
Feb. 21, 2019 (JP) .................................. 2019-029888

(51) Int. Cl.
*H04N 23/68* (2023.01)
*G06F 16/51* (2019.01)
(Continued)

(52) U.S. Cl.
CPC ........... *H04N 23/683* (2023.01); *G06F 16/51* (2019.01); *G06T 11/60* (2013.01); *H04N 5/2628* (2013.01)

(58) Field of Classification Search
CPC ...... H04N 23/683; H04N 5/2628; H04N 7/18; H04N 23/6811; G06F 16/51; G06T 11/60; G06T 3/00
See application file for complete search history.

(56) References Cited

U.S. PATENT DOCUMENTS 7,714,936 B1 * 5/2010 Martin ............. G08B 13/19628
348/576
2011/0007175 A1 1/2011 Fujita et al.
(Continued)

FOREIGN PATENT DOCUMENTS

CN 101897174 A 11/2010
EP 2219364 A1 8/2010
(Continued)

OTHER PUBLICATIONS

International Search Report and Written Opinion of PCT Application No. PCT/JP2019/051278, dated Mar. 24, 2020, 08 pages of ISRWO.

*Primary Examiner* — Jason A Flohre
(74) *Attorney, Agent, or Firm* — CHIP LAW GROUP

(57) ABSTRACT

Shake correction is performed using posture information corresponding to each frame of image data constituting a moving image on each frame, the frame having been subjected to processing of pasting to a celestial sphere model. Further, protrusion prevention processing for correcting an effective cropping area from each frame so that the effective cropping area does not protrude from a movable area in which the effective shake correction is maintained is performed on a requested cropping area to set an effective cropping area applied to each frame. Processing for generating an effective cropping area image is performed, the effective cropping area image being an image subjected to the shake correction and then projected onto a plane model (Continued)

from the celestial sphere model and being an image of the set effective cropping area.

20 Claims, 26 Drawing Sheets

(51) Int. Cl.
    *G06T 11/60*     (2006.01)
    *H04N 5/262*     (2006.01)

(56) References Cited

U.S. PATENT DOCUMENTS

| | | | |
|---|---|---|---|
| 2013/0208134 A1* | 8/2013 | Hamalainen | H04N 23/683 |
| | | | 348/208.99 |
| 2015/0062292 A1* | 3/2015 | Kweon | G06T 3/0018 |
| | | | 348/37 |
| 2017/0078577 A1* | 3/2017 | Wakamatsu | H04N 23/687 |
| 2018/0343388 A1* | 11/2018 | Matsushita | H04N 23/683 |
| 2019/0028645 A1* | 1/2019 | Satoh | H04N 23/61 |
| 2020/0162671 A1* | 5/2020 | Toda | H04N 5/2628 |
| 2021/0014399 A1* | 1/2021 | Yamazaki | H04N 23/6811 |

FOREIGN PATENT DOCUMENTS

| | | |
|---|---|---|
| JP | 2006-295626 A | 10/2006 |
| JP | 2009-147727 A | 7/2009 |
| JP | 2016-105534 A | 6/2016 |
| WO | 2009/078327 A1 | 6/2009 |
| WO | 2018/211782 A1 | 11/2018 |

\* cited by examiner

Fig. 1A  IMAGE SOURCE  IMAGE PROCESSING DEVICE
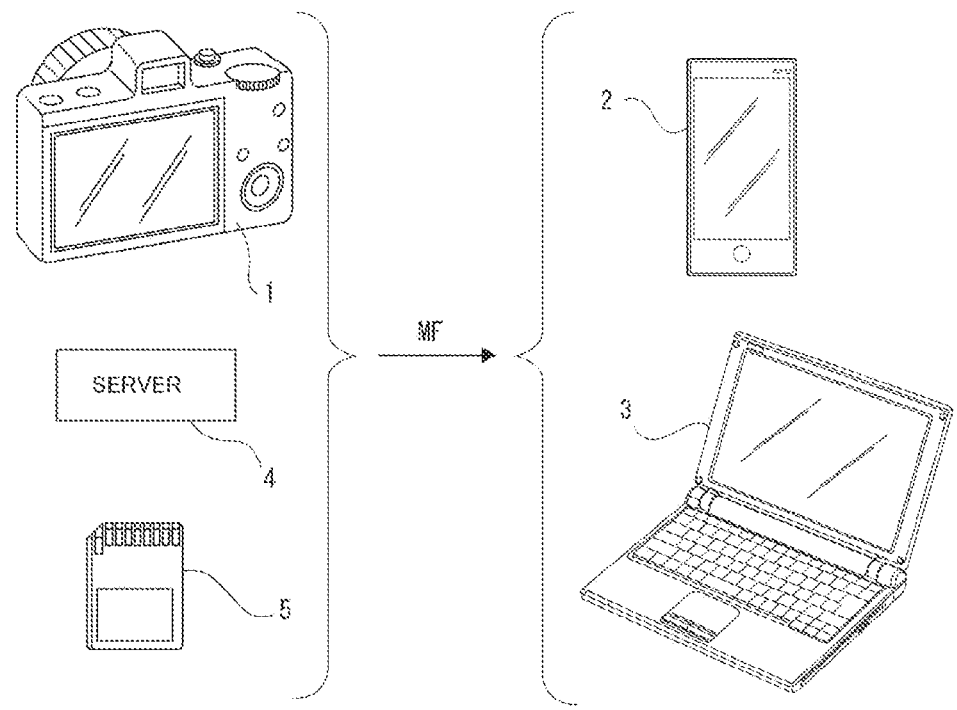
Fig. 1B  IMAGE PROCESSING DEVICE AS IMAGE SOURCE
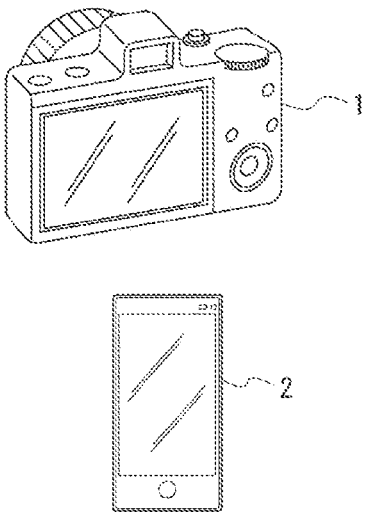

RELATIONSHIP BETWEEN IMAGER PLANE AND INCIDENCE ANGLE

PROCESS IN OUTPUT COORDINATE PLANE

CONVERT TO NORMALIZED SPACE

ROTATION

CALCULATION OF CELESTIAL
SPHERE CORRESPONDENCE
POINTS IN PERSPECTIVE PROJECTION

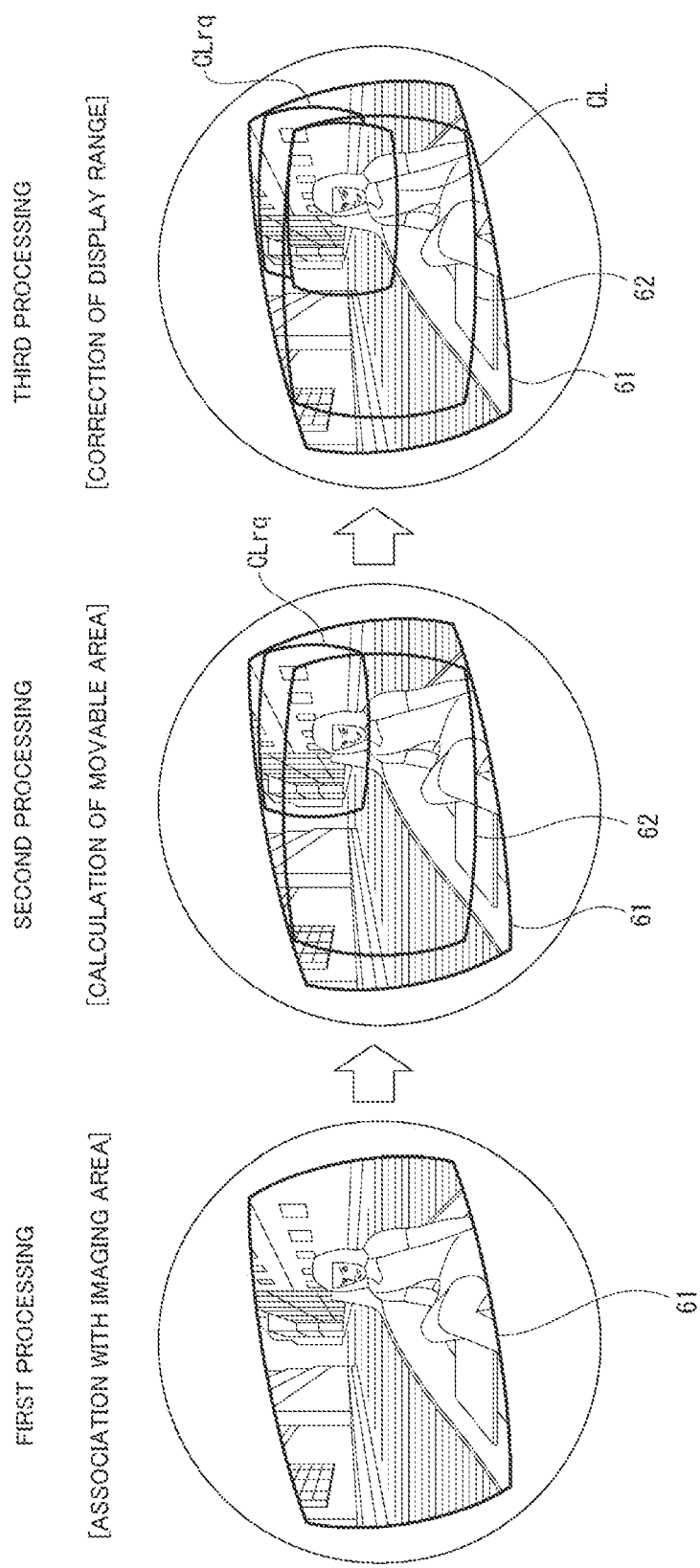

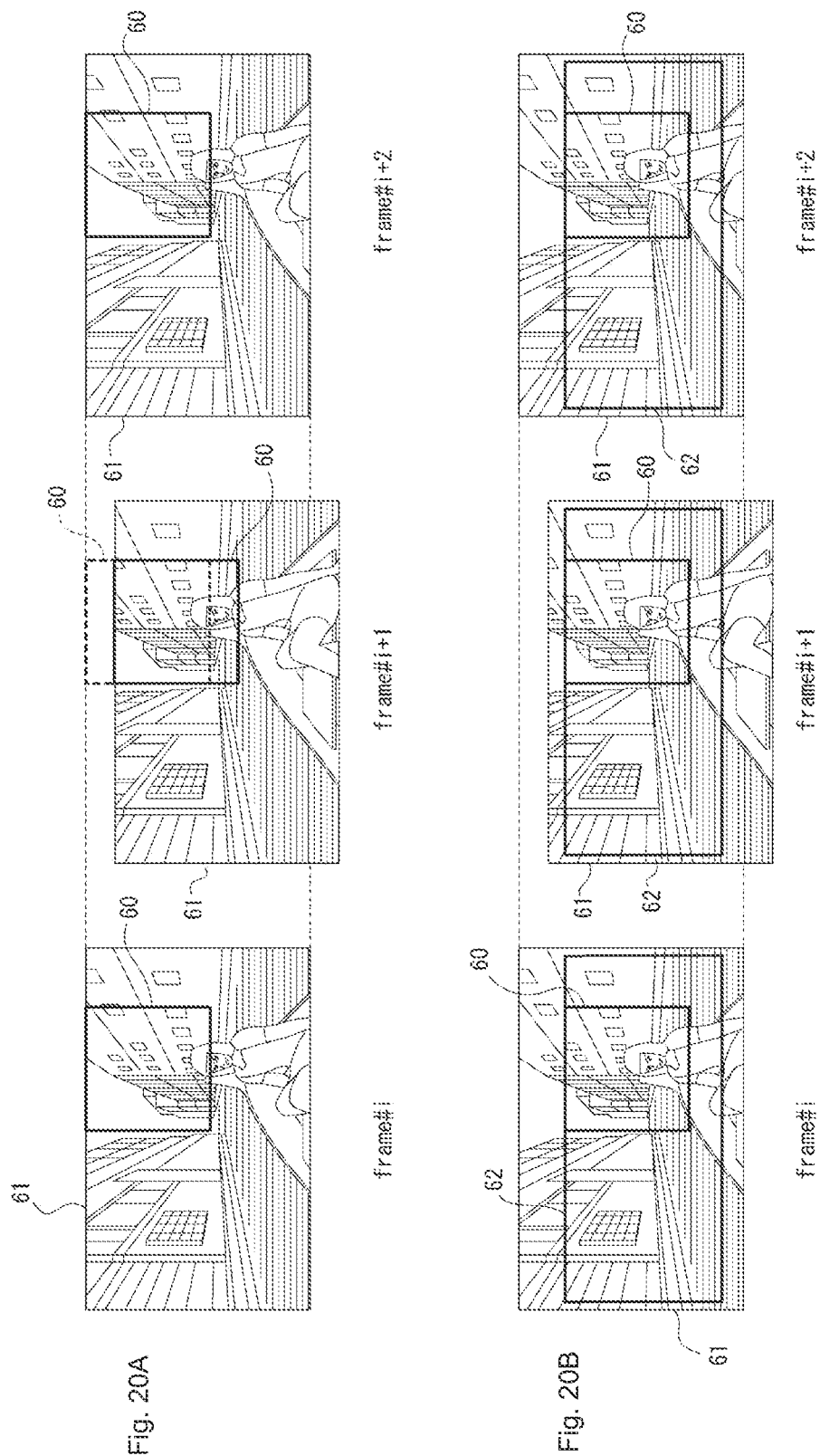

CAPTURED AREA OF
FRAME # i-m ~ TO i+m

AVAILABLE AREA
OF FRAME #i

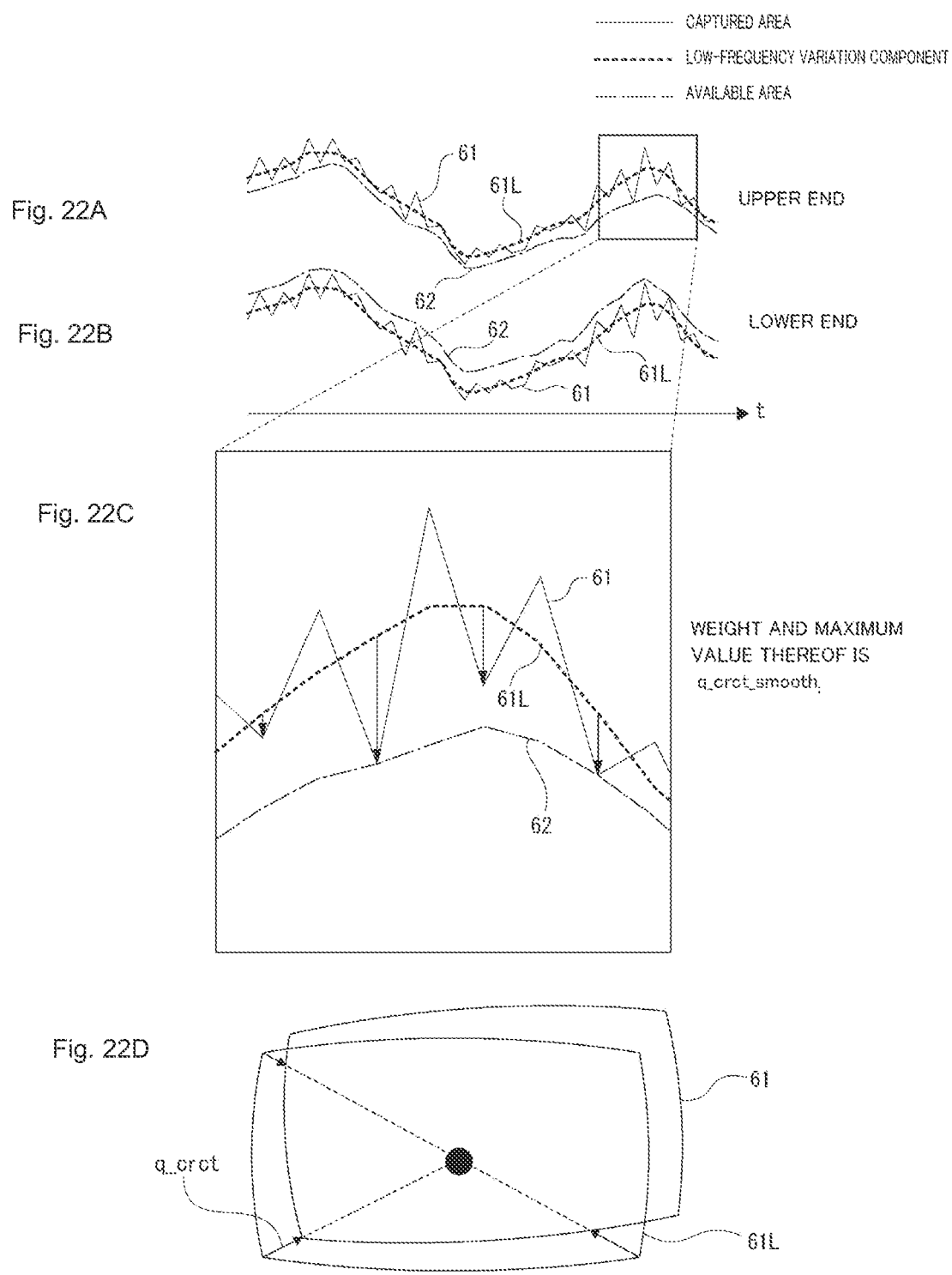

CORRECTION OF ROLL COMPONENT

CORRECTION OF YAW AND PITCH COMPONENTS

FISHEYE LENS

NORMAL LENS

EXPRESSION ON CELESTIAL SPHERE MODEL

SHAPE OF CAPTURED AREA

IMAGE PROCESSING DEVICE, IMAGE PROCESSING METHOD, AND PROGRAM

CROSS REFERENCE TO RELATED APPLICATIONS

This application is a U.S. National Phase of International Patent Application No. PCT/JP2019/051278 filed on Dec. 26, 2019, which claims priority benefit of Japanese Patent Application No. JP 2019-029888 filed in the Japan Patent Office on Feb. 21, 2019. Each of the above-referenced applications is hereby incorporated herein by reference in its entirety.

TECHNICAL FIELD

The present technology relates to technical fields related to an image processing device, an image processing method, and image processing applied as a program.

BACKGROUND ART

A technology for performing various types of image processing such as correction on moving images captured by an imaging device is known.

PTL 1 below describes that camera shake correction or image distortion correction is performed on image data using posture data of an imaging device.

CITATION LIST

Patent Literature

[PTL 1] WO2018/211782

SUMMARY

Technical Problem

Incidentally, in recent years, users have been able to easily perform image capturing, image correction, or the like using mobile terminals such as smartphones or tablets, cameras themselves, personal computers, or the like, and moving image posting or the like is also popular.

In such an environment, it is desired to produce higher quality images or various images, instead of outputting images captured by a user as they are.

Therefore, the present disclosure proposes a technology for making it possible to easily perform high-quality image processing that takes shake correction or image cropping into account.

Solution to Problem

An information processing device according to the present technology includes: a shake correction unit configured to perform shake correction using posture information corresponding to each frame of image data constituting a moving image on each frame, the frame having been subjected to processing of pasting to a celestial sphere model; an effective cropping area setting unit configured to perform protrusion prevention processing for correcting an effective cropping area from each frame so that the effective cropping area does not protrude from a movable area in which effective shake correction is maintained, on a requested cropping area, to set an effective cropping area applied to each frame; and an effective cropping area image generation processing unit configured to perform processing for generating an effective cropping area image, the effective cropping area image being an image subjected to the shake correction by the shake correction unit and then projected onto a planar model from the celestial sphere model and being an image of the effective cropping area set by the effective cropping area setting unit.

For example, shake (interframe shake) caused by camera shake or the like in an image captured by the imaging device is corrected through coordinate transformation on a celestial sphere model, and a cropping area of the image subjected to this shake correction and projected onto a plane is set on the basis of an operation of a user or the like. In this case, the effective cropping area obtained by correcting the requested cropping area set according to the operation of the user or the like so that the requested cropping area does not protrude from the movable area in which the effective interframe shake correction is maintained is set, and cropping is performed based on this effective cropping area.

In the image processing device according to the present technology, the effective cropping area setting unit sets the effective cropping area using operation information based on a user operation.

For example, when an operation for designating the cropping area performed according to an operation of the user on a screen in which a moving image file has been paused is performed, the effective cropping area may be set such that the effective cropping area reflects the information on the operation.

In the image processing device according to the present technology, it is conceivable that the effective cropping area setting unit set the effective cropping area using tracking target information regarding a tracking target.

For example, the effective cropping area is set so that the tracking target is included in the image.

In particular, in this case, in the image processing device according to the present technology, it is conceivable that the effective cropping area setting unit sets the tracking target using the operation information based on the user operation.

For example, when designation regarding a subject as a target to be tracked or a tracking target is made according to an operation of the user on the screen in which a moving image file has been paused, the effective cropping area is set to reflect information on the operation.

In the image processing device according to the present technology, it is conceivable that the effective cropping area setting unit set the effective cropping area using operation information for designating a disposition position within a screen of the tracking target.

The disposition position within the screen of the tracking target is a position at which a tracking target subject is displayed in a range displayed on the screen (for example, a center of the screen or the upper right of the screen). The user is allowed to arbitrarily designate the disposition position within the screen.

In the image processing device according to the present technology, it is conceivable that the effective cropping area setting unit use operation information for designating an output area of the image, for setting of the effective cropping area.

For example, an area of an image to be output can be designated according to an operation of the user, and the effective cropping area is set using information on the operation.

In the image processing device according to the present technology, it is conceivable that the effective cropping area setting unit use operation information for designating an aspect ratio of the image, for setting of the effective cropping area. For example, an aspect ratio of an image (a ratio of a vertical size to a horizontal size of the image) to be output can be designated according to an operation of the user, and the effective cropping area is set using information on the operation.

In the image processing device according to the present technology, it is conceivable that the effective cropping area setting unit perform, as protrusion prevention processing performed on each frame of the image data, first processing of setting the requested cropping area on coordinates of the celestial sphere model in which the shake correction unit has performed the shake correction; and second processing of obtaining a movable area in which variation in the requested cropping area is allowed within an imaging area, and third processing of correcting the requested cropping area so that the requested cropping area is accommodated within the movable area to set the effective cropping area.

Through the first, second, and third processing, the protrusion prevention processing is processing for causing a cropping area based on the operation information, for example, a cropping area set by reflecting designation of the output area of the image of the user or the tracking state to be accommodated in a range in which the shake correction is effective.

In the image processing device according to the present technology, it is conceivable that in the second processing, the movable area is set using each imaging area of a plurality of consecutive frames including a frame as a processing target and a frame at a subsequent point in time in a time axis direction from the frame as a processing target, the frame as the processing target and a frame at a previous point in time in the time axis direction from the frame as a processing target, or the frame as the processing target and frames at subsequent previous points in time in the time axis direction from the frame as a processing target.

That is, the movable area is set using an imaging area of a plurality of previous and subsequent consecutive frames including the frame as the processing target or a plurality of subsequent consecutive frames including the frame as the processing target.

In the image processing device according to the present technology, it is conceivable that the movable area be a range commonly included in imaging areas in which the shake correction has been performed on each of a plurality of frames.

An area commonly included in imaging areas that are in a state in which shake correction has been performed on each frame is a range in which a subject exists over a plurality of frames.

In the image processing device according to the present technology, it is conceivable that the movable area be a range shown when a low-frequency variation component of change in each end point of the imaging area for each of the plurality of frames is accommodated within the imaging area of each frame.

It can be said that, for each frame, the low-frequency variation component of change in each end point of the imaging area is a variation corresponding to a waveform observed when a waveform in a case in which a position variation of each end point is captured in a time axis direction (a traveling direction of the frame) passes through a low-pass filter.

In the image processing device according to the present technology, it is conceivable that the third processing be performed by moving the requested cropping area toward a center of the movable area without rotating the requested cropping area until the requested cropping area is accommodated in the movable area.

That is, the requested cropping area is moved by a required distance without being rotated until the requested cropping area is accommodated in the movable area.

In the image processing device according to the present technology, it is conceivable that, in the third processing, when the requested cropping area cannot be accommodated in the movable area due to movement of the requested cropping area toward the center of the movable area without rotation of the requested cropping area, the requested cropping area is rotated so that the requested cropping area is accommodated in the movable area.

That is, the requested cropping area is rotated only when the requested cropping area is not accommodated in the movable area in a state in which the requested cropping area is not rotated.

In the image processing device according to the present technology, it is conceivable that the shake correction unit acquire the posture information corresponding to each frame on the basis of metadata generated at the time of capturing the image data as a processing target, and uses the posture information for shake correction. The metadata is associated with the image data in the imaging device that performs imaging. In this case, for example, it is assumed that information such as an acceleration or angular velocity applied to the imaging device is included as metadata.

In the image processing device according to the present technology, it is conceivable that the shake correction unit perform shake correction on each frame of the image data using the posture information acquired on the basis of a timing of an exposure centroid for each line.

When the exposure period is time-shifted for each line of one frame according to a rolling shutter scheme of the imaging element, the posture differs for each timing of the line. In this case, a timing of a centroid position is used as a reference for each line.

In the image processing device according to the present technology, it is conceivable that the shake correction unit perform correction cancellation processing on image data as a processing target using metadata associated with the image data, and perform the processing of pasting to the celestial sphere model in a state in which return to a state before correction processing that has been already performed is performed has occurred.

For example, in the imaging device, although correction processing such as camera shake correction is performed at the time of imaging, but shake correction is performed on the image data as a processing target after such correction which has already been formed is canceled.

In the image processing device according to the present technology, it is conceivable that the shake correction unit perform correction cancellation using coordinate transformation parameters associated with each frame of the image data as metadata.

The coordinate transformation parameter is, for example, information in a case in which an image frame (an image range including an angle of view) of the captured image or a coordinate system of the captured image is changed, such as respective parameters of lens distortion, trapezoidal distortion, focal plane distortion, electrical image stabilization, and optical image stabilization.

It is conceivable that the image processing device according to the present technology, include a pre-processing unit configured to extract and store metadata corresponding to each frame of the image data with respect to an image file including the image data constituting the moving image and corresponding metadata.

When the image file as a moving image is an image processing target, the metadata for each frame is stored.

The information processing method according to the present technology includes: performing, by an image processing device, processing of performing shake correction using posture information corresponding to each frame of image data constituting a moving image on each frame, the frame having been subjected to processing of pasting to a celestial sphere model; performing protrusion prevention processing for correcting an effective cropping area from each frame so that the effective cropping area does not protrude from a movable area in which the effective shake correction is maintained, on a requested cropping area, to set an effective cropping area applied to each frame; and generating an effective cropping area image, the effective cropping area image being an image subjected to the shake correction and then projected onto a plane model from the celestial sphere model and being an image of the set effective cropping area.

Accordingly, the protrusion prevention processing is added to the setting of the cropping area based on the operation information.

A program related to the present technology is a program causing an information processing device to execute a process corresponding to such an image processing method.

This makes it possible to execute the image processing of the present disclosure in various information processing devices.

BRIEF DESCRIPTION OF DRAWINGS

FIGS. 1A and 1B are illustrative diagrams of a device that is used in an embodiment of the present technology.

FIG. 19 is an illustrative diagram of an overview of protrusion prevention processing according to the embodiment.

FIGS. 20A and 20B are illustrative diagrams of calculation of an available area in the protrusion prevention processing of the embodiment.

FIGS. 22A, 22B, 22C, and 22D are illustrative diagrams of a method of creating an available area of the embodiment.

DESCRIPTION OF EMBODIMENTS

Figure 2:
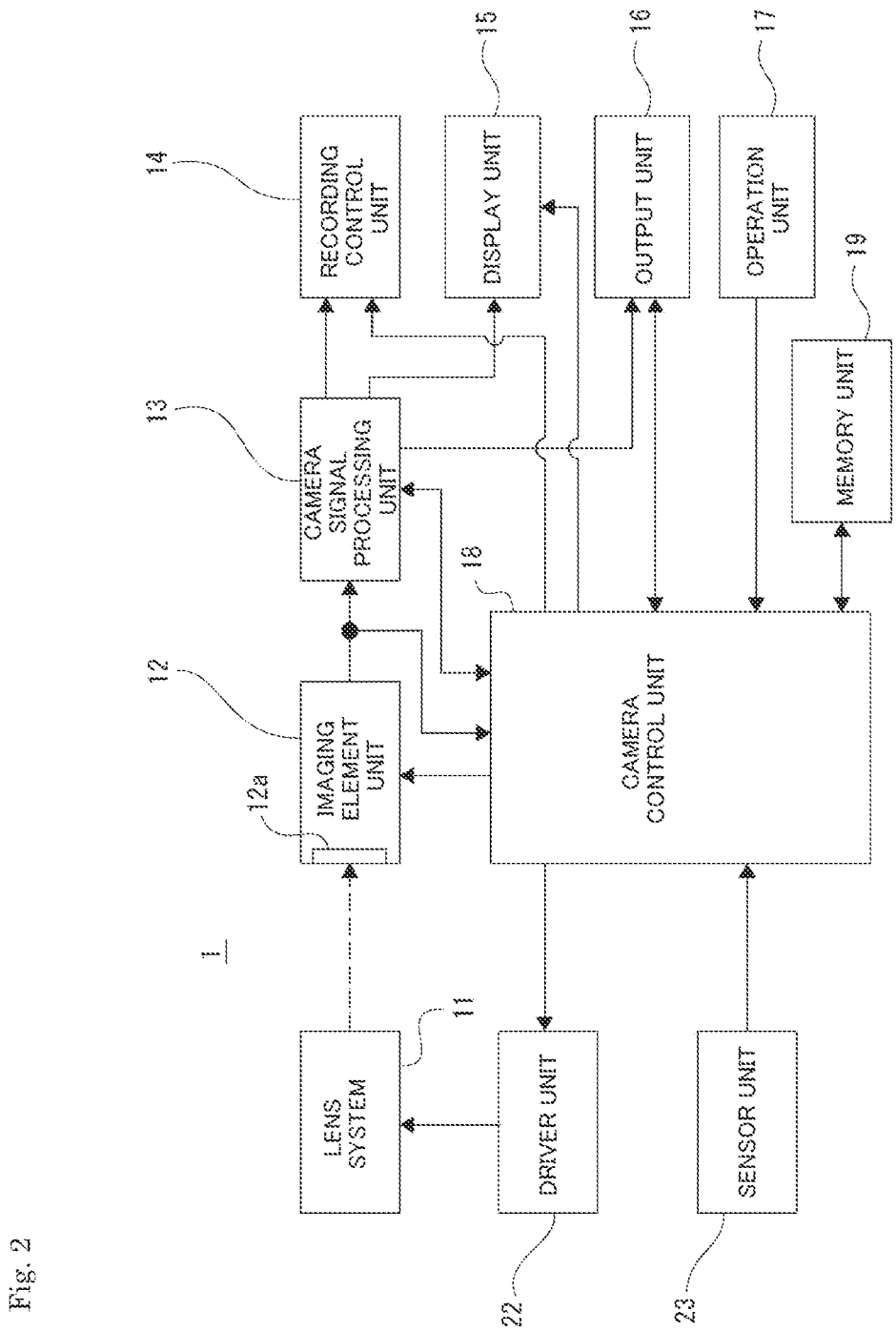
FIG. 2 is a block diagram of an imaging device of the embodiment.

Hereinafter, embodiments will be described in the following order.

<1. Configuration of device applicable as image processing device>
<2. Image file and metadata>
<3. Overview of screen transition>
<4. Image processing>
<5. Conclusion and modification examples>

1. Configuration of Device Applicable as Image Processing Device

In the following embodiment, an example in which an image processing device according to the present disclosure is realized mainly by a mobile terminal such as a smartphone will be described, but the image processing device can be realized in various devices. First, devices to which the technology of the present disclosure can be applied will be described.

FIG. 1A illustrates an example of an image source and an image processing device that acquires an image file MF from the image source.

An imaging device 1, a server 4, a recording medium 5, and the like are assumed as the image sources.

A mobile terminal 2 such as a smartphone, a personal computer 3, or the like is assumed as the image processing device.

The imaging device 1 as the image source is, for example, a digital camera capable of performing moving image capturing, and transfers an image file MF obtained by the moving image capturing to the mobile terminal 2 or the personal computer 3 via wired communication or wireless communication.

The server 4 may be any one of a local server, a network server, a cloud server, and the like, but refers to a device capable of providing the image file MF captured by the imaging device 1. It is conceivable that the server 4 transfer the image file MF to the mobile terminal 2 or the personal computer 3 via any transmission path.

The recording medium 5 may be any one of a solid-state memory such as a memory card, a disc-form recording medium such as an optical disc, a tape-shaped recording medium such as a magnetic tape, and the like but refers to a removable recording medium in which the image file MF captured by the imaging device 1 is recorded. It is conceivable that the image file MF read from the recording medium 5 is read by the mobile terminal 2 or the personal computer 3.

The mobile terminal 2 or the personal computer 3 as the image processing device can perform image processing on the image file MF acquired from the above image source. The image processing referred to herein includes, for example, shake correction processing, cropping area setting processing, and effective cropping area image generation processing.

The shake correction processing is shake correction processing that is performed using posture information corresponding to a frame of image data constituting a moving image after processing of pasting to a celestial sphere model is performed on each frame.

The cropping area setting processing is processing of setting a cropping area of an image on the basis of information on an operation of the user and then performing protrusion prevention processing for performing correction so that the cropping area does not protrude from an area in which shake correction is effectively maintained. The effective cropping area image generation processing is processing for cropping an image in a cropping area (an effective cropping area CL) obtained by performing protrusion prevention processing on an image projected onto a plane in a state in which shake correction processing has been performed, to generate an effective cropping area image. The cropped image can be an output image.

A certain mobile terminal 2 or personal computer 3 may serve as an image source for another mobile terminal 2 or personal computer 3 that functions as an image processing device.

FIG. 1B illustrates the imaging device 1 and the mobile terminal 2 in a case in which one device functioning as an image processing device also serves as the image source.

For example, a microcomputer or the like inside the imaging device 1 performs the above image processing. That is, the imaging device 1 can perform the above image processing as it is on the image file MF generated by the imaging and perform image output as an image processing result.

The same applies to the mobile terminal 2, and since the mobile terminal 2 can be an image source by including an imaging function, the mobile terminal 2 can perform the above image processing on the image file MF generated by imaging and perform image output as an image processing result.

Of course, the present technology is not limited to the imaging device 1 or the mobile terminal 2, and various other devices that can serve as an image processing device serving as an image source can be considered.

There are various devices and image sources functioning as the image processing device of the embodiment as described above, but hereinafter, an example in which the imaging device 1 is the image source and the mobile terminal 2 is the image processing device will be described. That is, this example is an example in which the image file MF formed by the imaging in the imaging device 1 is transferred to the mobile terminal 2, and the acquired image file MF is subjected to image processing in the mobile terminal 2.

First, a configuration example of the imaging device 1 serving as an image source will be described with reference to FIG. 2.

As described in FIG. 1B, when it is assumed that the image file MF captured by the mobile terminal 2 is subjected to image processing in the mobile terminal 2, the mobile terminal 2 may have the same configuration as the following imaging device 1 in terms of an imaging function.

As illustrated in FIG. 2, the imaging device 1 includes a lens system 11, an imaging element unit 12, a camera signal processing unit 13, a recording control unit 14, a display unit 15, an output unit 16, an operation unit 17, a camera control unit 18, a memory unit 19, a driver unit 22, and a sensor unit 23.

The lens system 11 includes, for example, lenses such as a cover lens, a zoom lens, and a focus lens, and an aperture mechanism. Light (incident light) from a subject is guided by the lens system 11 and condensed on the imaging element unit 12. Although not illustrated, an optical image stabilization mechanism that corrects shake (interframe shake) and blur of an image due to camera shake or the like may be provided in the lens system 11.

The imaging element unit 12 includes, for example, an image sensor 12a (an imaging element), such as a complementary metal oxide semiconductor (CMOS) type or charge coupled device (CCD) type image sensor.

This imaging element unit 12 executes, for example, correlated double sampling (CDS) processing, automatic gain control (AGC) processing, and the like for an electric signal obtained by photoelectric conversion of light received by the image sensor 12a, and further performs analog/digital (A/D) conversion processing. An imaging signal as digital data is output to the camera signal processing unit 13 or the camera control unit 18 in a subsequent stage.

An optical image stabilization mechanism (not illustrated) is, for example, a mechanism for correcting shake of an image by moving the image sensor 12a instead of the lens system 11, or a spatial optical image stabilization mechanism using a gimbal (a balanced optical image stabilization mechanism), and any scheme may be used.

In the optical image stabilization mechanism, blur in the frame is also corrected as will be described below in addition to the shake (interframe shake).

The camera signal processing unit 13 is configured as an image processing processor by, for example, a digital signal processor (DSP). The camera signal processing unit 13 performs various types of signal processing on a digital signal (a captured image signal) from the imaging element unit 12. For example, the camera signal processing unit 13 performs preprocessing, simultaneous processing, YC generation processing, resolution conversion processing, codec processing, and the like as camera processing.

Further, the camera signal processing unit 13 performs various types of correction processing. However, it is assumed that image stabilization may or may not be performed in the imaging device 1.

In the preprocessing, clamping processing for clamping black levels of R, G, and B to a predetermined level, processing for correction between the color channels of R, G, and B, or the like is performed on the captured image signal from the imaging element unit 12.

In the simultaneous processing, color separation processing is performed so that image data for each pixel has all color components of R, G, and B. For example, in the case of an imaging element using color filters in a Bayer array, demosaic processing is performed as the color separation processing.

In the YC generation processing, a luminance (Y) signal and a color (C) signal are generated (separated) from image data of R, G, and B.

In the resolution conversion processing, resolution conversion processing is executed for the image data subjected to various types of signal processing.

Figure 3:
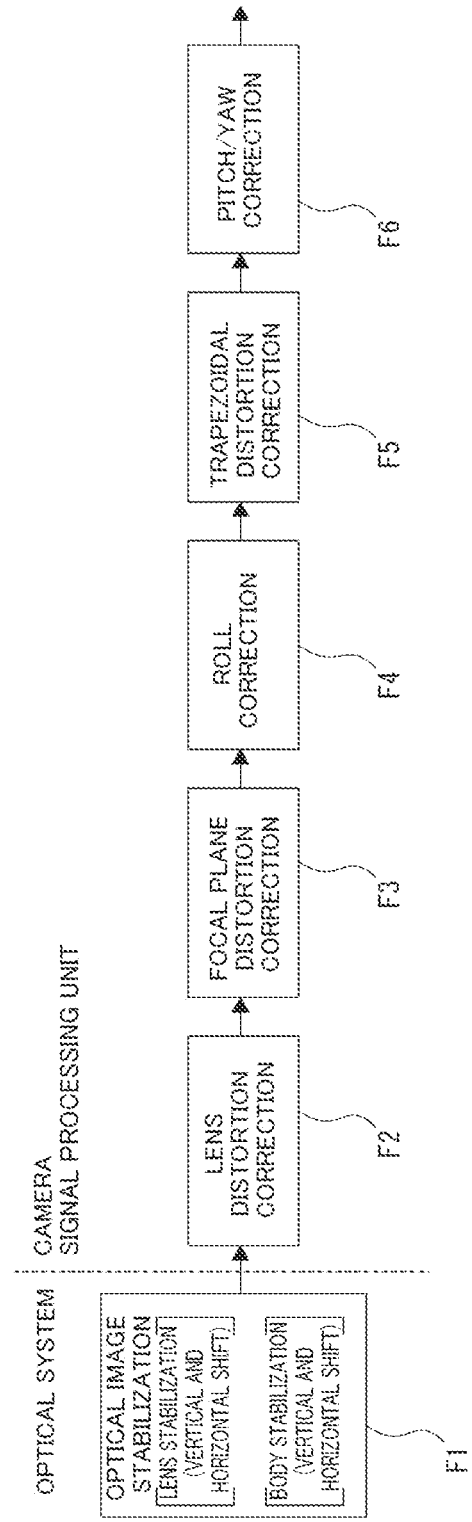
FIG. 3 is an illustrative diagram of image correction processing in the imaging device of the embodiment.

An example of various types of correction processing (internal correction of the imaging device 1) that is performed by the camera signal processing unit 13 is illustrated in FIG. 3. In FIG. 3, the optical image stabilization that is performed by the lens system 11 and the correction processing that is performed by the camera signal processing unit 13 are illustrated in execution order.

In the optical image stabilization as processing F1, in-lens image stabilization due to shifting in a yaw direction and a pitch direction of the lens system 11 or in-body image stabilization due to shifting in the yaw direction and the pitch direction of the image sensor 12a is performed so that an image of the subject is formed on the image sensor 12a in a state in which an influence of camera shake is physically canceled. One or both of the in-lens image stabilization and the in-body image stabilization may be used. When both of the in-lens image stabilization and the in-body image stabilization are used, it is conceivable that in the in-body image stabilization, shifting in the yaw direction and the pitch direction is not performed. Further, neither the in-lens image stabilization nor the in-body image stabilization is adopted, and for image stabilization, only electrical image stabilization or only optical image stabilization may be performed.

In the camera signal processing unit 13, processing from processing F2 to processing F6 is performed through spatial coordinate transformation for each pixel.

In processing F2, lens distortion correction is performed.

In processing F3, the focal plane distortion correction is performed as one element of the electric image stabilization. This is, for example, correcting distortion in a case in which reading using a rolling shutter scheme is performed by the CMOS type image sensor 12a.

Roll correction is performed in processing F4. That is, correction of a roll component is performed as one element of the electrical image stabilization.

In processing F5, trapezoidal distortion correction is performed on a trapezoidal distortion amount caused by the electrical image stabilization. The trapezoidal distortion amount caused by the electrical image stabilization is perspective distortion caused by cropping a place away from a center of the image.

In processing F6, shifting or cropping in the pitch direction and the yaw direction is performed as one element of the electrical image stabilization.

For example, the image stabilization, the lens distortion correction, and the trapezoidal distortion correction are performed by the above procedure.

It is not essential to perform all of the processing listed here, and an order of the processing may be changed appropriately.

In the codec processing in the camera signal processing unit 13, coding processing for recording or communication, and file generation, for example, are performed on the image data subjected to the various types of processing. For example, generation of an image file MF in an MP4 format used for recording an MPEG-4 compliant moving image/audio is performed. It is also conceivable to perform generation of a file in a format such as Joint Photographic Experts Group (JPEG), Tagged Image File Format (TIFF), or Graphics Interchange Format (GIF) as a still image file.

The camera signal processing unit 13 also performs generation of metadata to be added to the image file MF using, for example, information from the camera control unit 18.

Further, although an audio processing system is not illustrated in FIG. 2, in fact, an audio recording system and an audio processing system are included, and the image file MF may include audio data together with image data serving as a moving image.

The image data has a preset aspect ratio, and all frames of the image data correspond to an imaged area (captured area) to be described below.

The recording control unit 14 performs, for example, recording and playback on a recording medium using a non-volatile memory. The recording control unit 14 performs processing of recording the image file MF such as moving image data or still image data, a thumbnail image, or the like on the recording medium, for example.

An actual form of the recording control unit 14 can be considered in various ways. For example, the recording control unit 14 may be configured as a flash memory and a writing/reading circuit thereof built in the imaging device 1, or may be in the form of a card recording/playback unit that performs recording and playback access for a recording medium that can be attached to and detached from the imaging device 1, such as a memory card (a portable flash memory, or the like). Further, the recording control unit 14 may be realized as a hard disk drive (HDD) or the like as a form built in the imaging device 1.

The display unit 15 is a display unit that performs various displays to an imaging person, and is, for example, a display panel or viewfinder using on a display device such as a liquid crystal panel (LCD: Liquid Crystal Display) or an organic electro-luminescence (EL) display disposed in a housing of the imaging device 1.

The display unit 15 causes various displays to be executed on the display screen on the basis of an instruction of the camera control unit 18.

For example, the display unit 15 causes the recording control unit 14 to display a playback image of the image data read from the recording medium.

Further, image data of the captured image of which a resolution has been converted for a display by the camera signal processing unit 13 may be supplied to the display unit 15, and the display unit 15 may perform a display on the basis of the image data of the captured image in response to an instruction from the camera control unit 18. Accordingly, a so-called through image (a monitoring image of a subject), which is a captured image that is being subjected to composition confirmation, is displayed.

Further, the display unit 15 causes a display of various operation menus, icons, messages, or the like, that is, a graphical user interface (GUI) to be executed on the screen on the basis of the instruction of the camera control unit 18.

The output unit 16 performs data communication or network communication with an external device by wire or wirelessly.

For example, image data (still image file or moving image file) is transmitted and output to an external display device, recording device, playback device, or the like. Further, the output unit 16 is a network communication unit, and may perform communication based on various networks such as the Internet, a home network, and a local area network (LAN), and perform transmission or reception of various pieces of data to or from a server, a terminal, or the like on the network.

The operation unit 17 collectively indicates an input device allowing the user to perform various operation inputs. Specifically, the operation unit 17 indicates various operators (keys, a dial, a touch panel, a touch pad, or the like) provided in the housing of the imaging device 1.

The operation of the user is detected by the operation unit 17, and a signal according to the input operation is sent to the camera control unit 18.

The camera control unit 18 is configured of a microcomputer (arithmetic processing device) including a central processing unit (CPU).

The memory unit 19 stores information or the like that the camera control unit 18 uses for processing. As the illustrated memory unit 19, for example, a read only memory (ROM), a random access memory (RAM), a flash memory, and the like are comprehensively shown.

The memory unit 19 may be a memory area built in the microcomputer chip serving as the camera control unit 18, or may be configured of a separate memory chip.

The camera control unit 18 executes a program stored in the ROM, flash memory, or the like of the memory unit 19 to control the entire imaging device 1.

For example, the camera control unit 18 controls operations of respective necessary units with respect to, for example, control of a shutter speed of the imaging element unit 12, an instruction for various types of signal processing in the camera signal processing unit 13, an imaging operation or a recording operation according to a user operation, a playback operation of recorded image files, an operation of the lens system 11 such as zoom, focus, and aperture adjustments in a lens barrel, and an operation of a user interface.

The RAM in the memory unit 19 is used for temporary storage of data, programs, and the like as a work area when various types of data processing of the CPU of the camera control unit 18 are performed.

The ROM or flash memory (a nonvolatile memory) in the memory unit 19 is used for storage of an operating system (OS) allowing the CPU to control each unit, content files such as image files, application programs for various operations, firmware, and the like.

A motor driver for a zoom lens drive motor, a motor driver for a focus lens drive motor, and a motor driver for an aperture mechanism motor, for example, are provided in the driver unit 22.

These motor drivers apply a drive current to the corresponding driver in response to an instruction from the camera control unit 18, to execute movement of a focus lens and zoom lens, opening and closing of aperture blades of the aperture mechanism, and the like.

The sensor unit 23 comprehensively indicates various sensors mounted in the imaging device.

The sensor unit 23 has, for example, an inertial measurement unit (IMU) mounted therein and detects, for example, an angular velocity using an angular velocity (gyro)sensor for three axes of pitch, yaw, and roll, and detects an acceleration using an acceleration sensor.

Further, a position information sensor, an illuminance sensor, or the like may be mounted as the sensor unit 23.

For example, the image file MF as a moving image captured and generated by the above imaging device 1 can be transferred to an image processing device such as the mobile terminal 2 and subjected to image processing.

Figure 4:
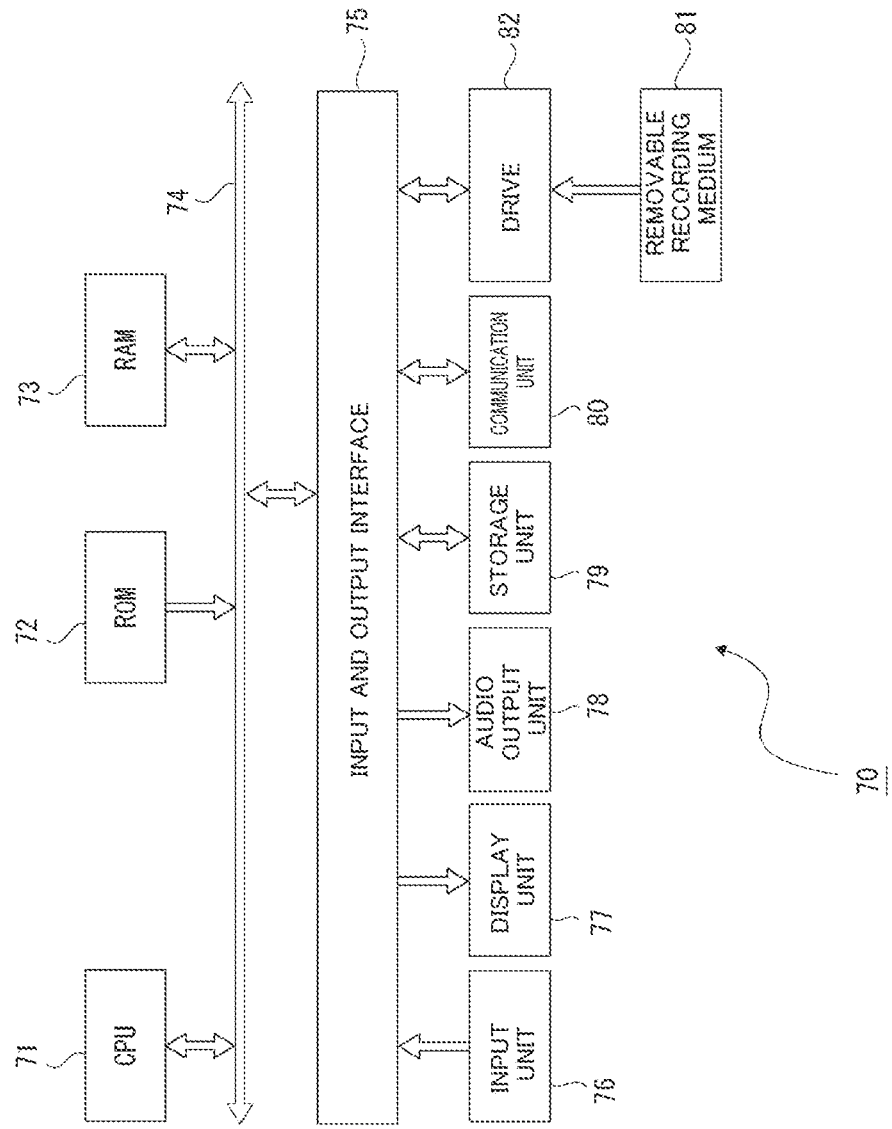
FIG. 4 is a block diagram of an information processing device of the embodiment.

The mobile terminal 2 can be realized as an information processing device having the configuration illustrated in FIG. 4, for example. Similarly, the personal computer 3 or the server 4 can also be realized by the information processing device having the configuration illustrated in FIG. 4.

In FIG. 4, a CPU 71 of an information processing device 70 executes various types of processing according to a program stored in a ROM 72 or a program loaded from a storage unit 79 into a RAM 73. The RAM 73 also appropriately stores data and the like necessary for the CPU 71 to execute various types of processing.

The CPU 71, ROM 72, and RAM 73 are connected to each other via a bus 74. An input and output interface 75 is also connected to the bus 74.

An input unit 76 including an operator or an operation device is connected to the input and output interface 75.

For example, various operators or operation devices such as a keyboard, mouse, keys, dial, touch panel, touch pad, and remote controller are assumed as the input unit 76.

An operation of the user is detected by the input unit 76, and a signal corresponding to the input operation is interpreted by the CPU 71.

Further, a display unit 77 configured of an LCD or an organic EL panel and an audio output unit 78 configured of a speaker or the like are connected to the input and output interface 75 as one body or separate bodies.

The display unit 77 is a display unit that performs various displays, and is configured of, for example, a display device provided in the housing of the information processing device 70, or, for example, a separate display device connected to the information processing device 70.

The display unit 77 executes a display of various images for image processing, a moving image that is a processing target, and the like on the display screen on the basis of an instruction of the CPU 71. Further, the display unit 77 displays various operation menus, icons, messages, or the like, that is, a graphical user interface (GUI) on the basis of an instruction of the CPU 71.

The storage unit 79 configured of a hard disk, a solid-state memory, or the like, or a communication unit 80 configured of a modem or the like may be connected to the input and output interface 75.

The communication unit 80 performs communication processing via a transmission line such as the Internet, and performs communication with various devices using wired/wireless communication, bus communication, or the like.

A drive 82 is also connected to the input and output interface 75 as necessary, and a removable recording medium 81 such as a magnetic disk, an optical disc, a magneto-optical disc, or a semiconductor memory is appropriately mounted in the drive 82.

Using the drive 82, it is possible to read data files such as an image file MF or various computer programs from the removable recording medium 81. The read data file is stored in the storage unit 79 or an image or audio included in the data file are output by the display unit 77 or the audio output unit 78. Further, the computer program or the like read from the removable recording medium 81 is installed in the storage unit 79, as necessary.

In the information processing device 70, for example, software for image processing in the image processing device of the present disclosure can be installed via network communication using the communication unit 80 or via the removable recording medium 81. Alternatively, the software may be stored in the ROM 72, the storage unit 79, or the like in advance.

Figure 5:
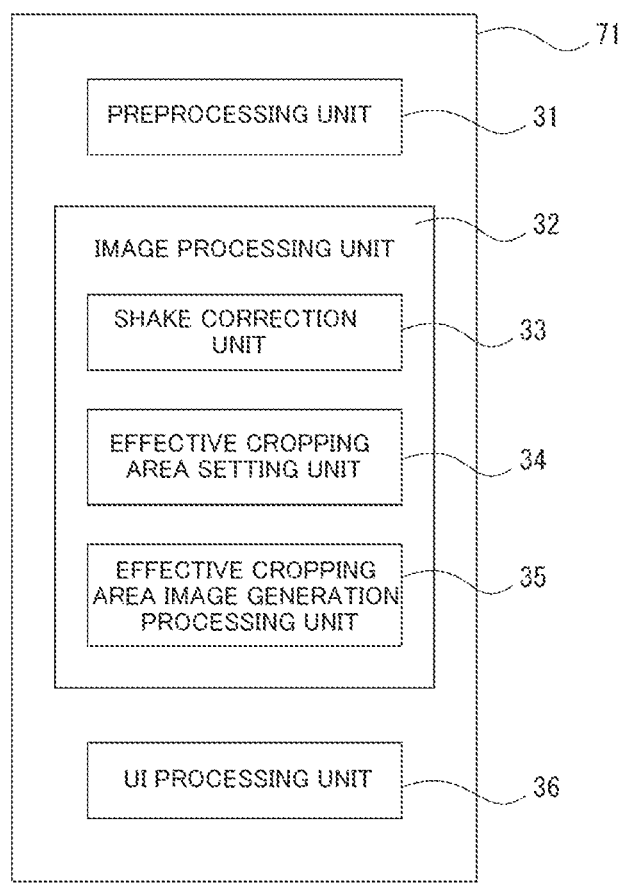
FIG. 5 is an illustrative diagram of a functional configuration as an image processing device of the embodiment.

For example, using such software (application program), a functional configuration as illustrated in FIG. 5 is constructed in the CPU 71 of the information processing device 70.

That is, the information processing device 70 (CPU 71) has functions of a preprocessing unit 31, an image processing unit 32, and a UI processing unit 36.

The preprocessing unit 31 has, for example, a function of performing import of the image file MF constituting the moving image generated by the imaging device 1 and preprocessing at the time of the import.

In the present specification, the "import" refers to the fact that, for example, an image file MF that is allowed to be accessed due to the information processing device 70 storing the image file MF in, for example, the storage unit 79 is set as an image processing target, and means performing preprocessing for image processing. For example, import does not mean transferring from the imaging device 1 to the mobile terminal 2.

The preprocessing unit 31 imports the image file MF designated by the user operation or the like so that the image file MF is the image processing target, and also performs processing regarding the metadata added to the image file MF as preprocessing. For example, the preprocessing unit 31 performs processing of extracting and storing the metadata corresponding to each frame of a moving image.

The image processing unit 32 has a function of performing image processing on the imported image file MF. The function of the image processing unit 32 includes functions of a shake correction unit 33, an effective cropping area setting unit 34, and an effective cropping area image generation processing unit 35 as illustrated in FIG. 5.

The shake correction unit 33 has a function of performing shake correction using posture information corresponding to the frame for each frame serving as image data constituting a moving image as the image file MF. For example, the shake correction unit 33 performs shake correction in a state in which pasting processing from a plane model to a celestial sphere model has been performed for each frame. That is, at the time of capturing an image as an image file MF, a subject image is projected onto a plane, but the shake correction is performed in a state in which the subject image is projected onto the celestial sphere model.

Here, the "shake" to be corrected refers to a vibration of the image due to a motion of the imaging device 1 that has captured the image file MF, and in particular, refers to a vibration component generated between the frames (shake of the image between the frames). "(Inter-frame) shake correction" refers to correcting shake that appears as such vibration between frames. The electrical image stabilization based on shifting or cropping scheme described above is included in "shake correction". Further, in the above-described optical image stabilization, "interframe shake correction" and "blur correction" are performed at the same time. When the imaging element unit 12 includes the CMOS type image sensor 12a using a rolling shutter scheme mounted therein, amounts of shake and blur differ for each line.

The effective cropping area setting unit 34 sets the effective cropping area of the image on the basis of the information on the operation of the user, information on a tracking target, and the like. The effective cropping area setting unit 34 includes a function of performing protrusion prevention processing for correcting the cropping area so that the cropping area does not protrude from the area in which the shake correction is effectively maintained.

The setting of the effective cropping area is not limited to the setting of a fixed cropping area according to the operation of the user, and the setting of the effective cropping area may be performed to include the tracking target according to the designation of the tracking target of the user.

In this case, the effective cropping area setting unit 34 also performs processing of specifying a position of the tracking target in each frame of the moving image through image analysis, inter-frame comparison, or the like.

The effective cropping area image generation processing unit 35 has a function of performing cropping processing on an output image that is an image of the effective cropping area designated by the effective cropping area setting unit 34 from the image projected onto the plane from a virtual spherical surface of the celestial sphere model in a state in which the shake correction unit 33 performs the shake correction.

The UI processing unit 36 has a function of performing, for example, reception of a user operation for import or image processing, and control of a display output according to the processing. Specifically, the UI processing unit 36 performs reception of the user operation or control of a display through respective screens such as an import screen, a preview screen, a framing screen, a trimming screen, a speed screen, an aspect ratio setting screen, and an export screen, which will be described below.

Figure 6:
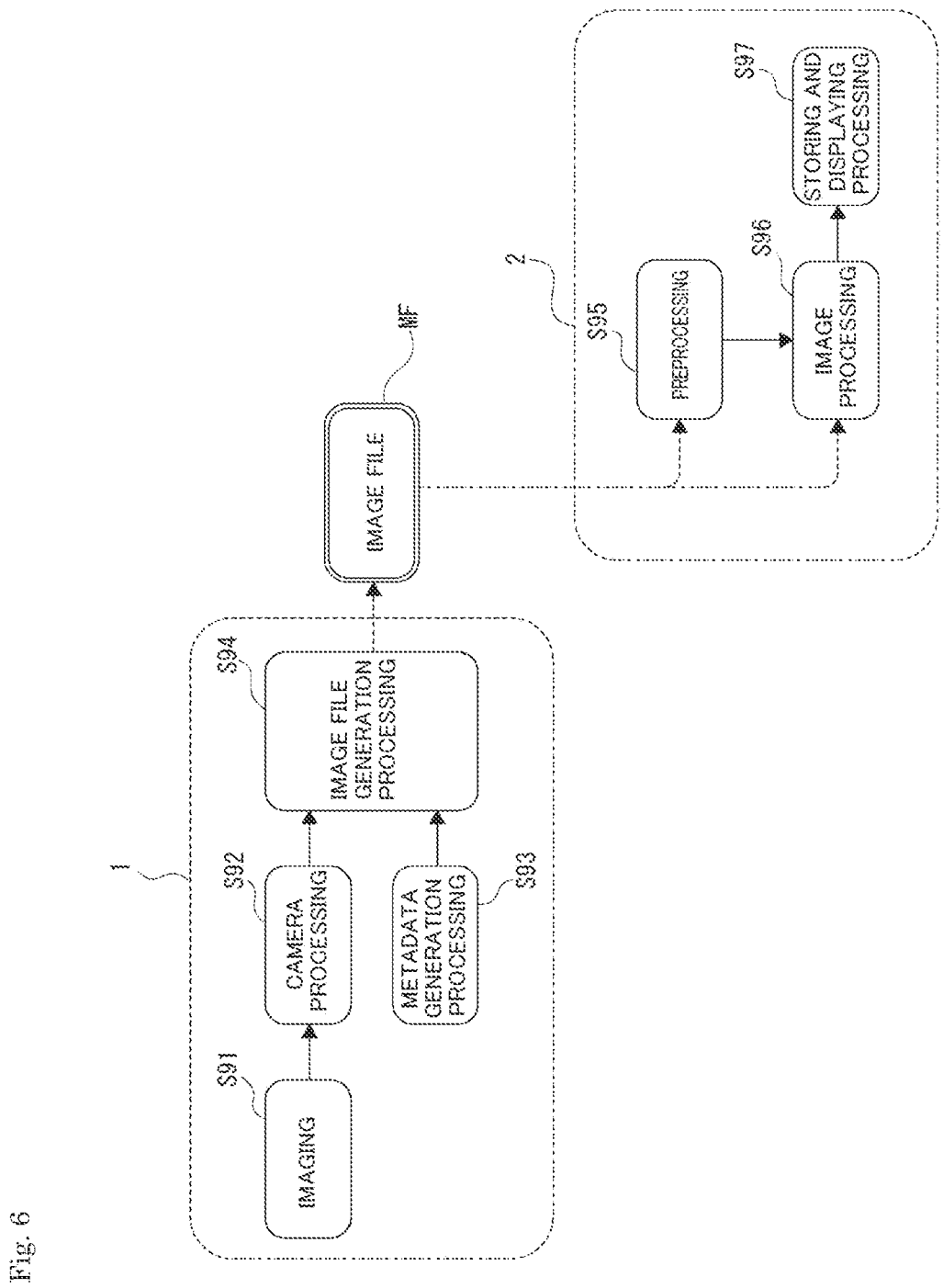
FIG. 6 is an illustrative diagram of an example of a flow of processing of the embodiment.

Details of the processing using the functions in FIG. 5 above will be described below. For example, processing in a flow as illustrated in FIG. 6 is performed by the imaging device 1 and the mobile terminal 2 corresponding to the information processing device 70 having the functions in FIG. 5.

The imaging device 1 performs imaging (step S91), camera processing (step S92), metadata generation processing (step S93), and image file generation processing (step S94).

The imaging in step S91 indicates an output of a captured image signal (RAW data output) in the imaging element unit 12.

The camera processing in step S92 is so-called development processing, and includes the various types of signal processing described above, which are performed on the captured image signal by the camera signal processing unit 13. The camera processing includes various types of correction processing described with reference to FIG. 3.

Further, the metadata generation processing of step S93 is, for example, processing of generating metadata associated with an image according to IMU data obtained by the sensor unit 23 or a camera control signal, and is performed in the camera signal processing unit 13 or the camera control unit 18.

In the camera signal processing unit 13, the image file generation processing of step S94 is performed to generate an image file including the image data subjected to the camera processing of step S92 and the metadata generated through the metadata generation processing of step S93, and the image file MF is generated.

The image file MF is acquired by the mobile terminal 2 via some route as described above.

In the mobile terminal 2, the image file MF is set as an image processing target, and storage and management of the metadata associated with each frame are performed as preprocessing (step S95) at the time of importing the image file MF. Further, the image processing in step S96 can be performed on the image file MF imported and subjected to preprocessing at any point in time. In this image processing, the shake correction of the shake correction unit 33, setting of the effective cropping area in the effective cropping area setting unit 34, and plane projection and cropping processing in the effective cropping area image generation processing unit 35, and the like are performed.

Storing and displaying processing is performed as step S97 in order to display or store a progress or result of the image processing.

According to such a flow, the user can perform image processing and perform playback, storing, uploading, and the like on the moving image captured by the imaging device 1, using the mobile terminal 2.

When the imaging device 1 has an image processing function of the image processing device of the present disclosure as illustrated in FIG. 1B, the camera control unit 18 or the camera signal processing unit 13 may include the functions as illustrated in FIG. 5.

Figure 7:
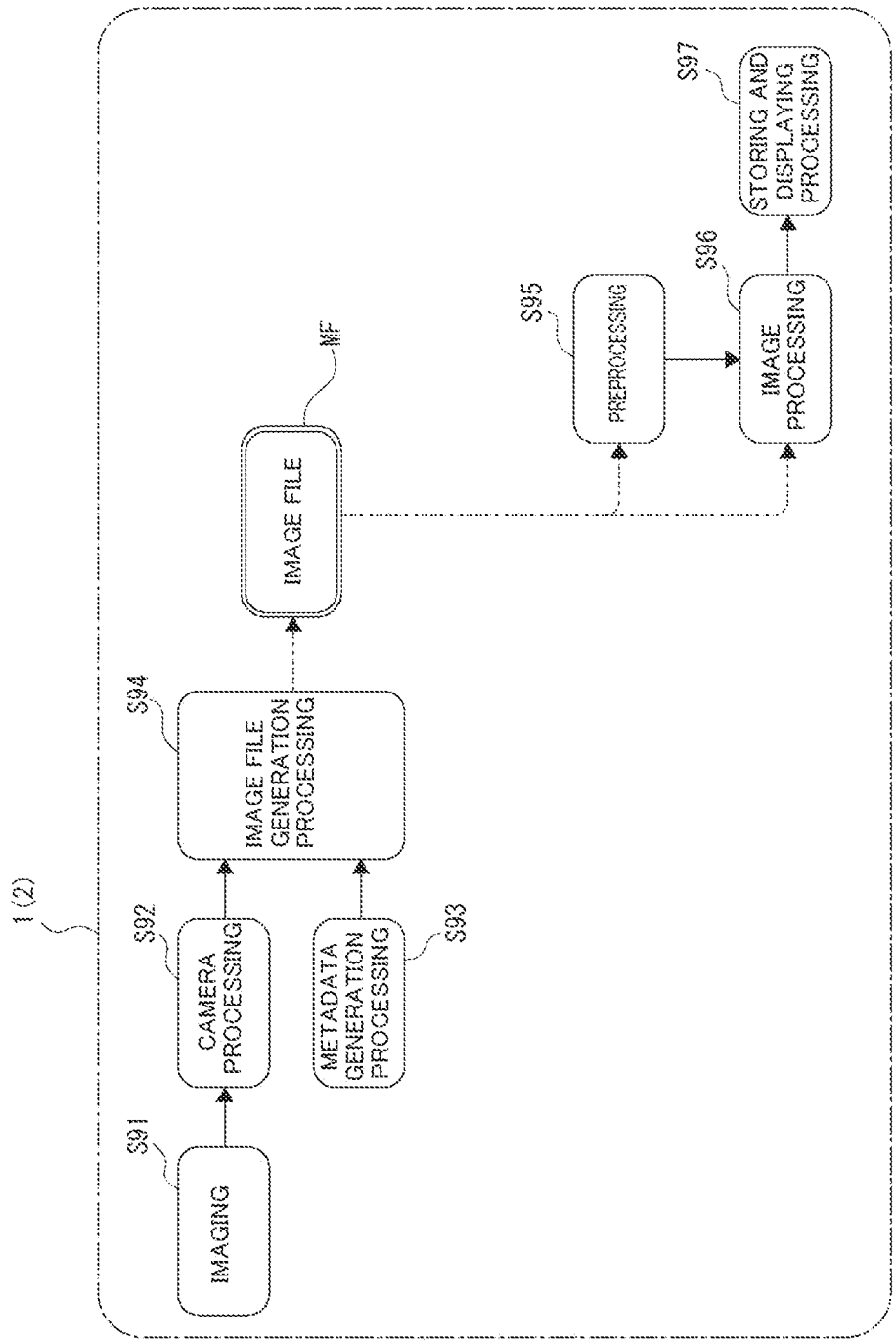
FIG. 7 is an illustrative diagram of an example of a flow of processing of the embodiment.

A flow of the processing in this case is illustrated in FIG. 7. That is, a case in which the preprocessing of step S95, the image processing of step S96, and the storing and displaying processing of step S97 are also performed in the imaging device 1 is illustrated.

Further, in FIG. 1B, a case in which the mobile terminal 2 performs imaging is also mentioned, but in this case, it is conceivable that the processing illustrated in FIG. 7 is performed in the mobile terminal 2.

Figure 8:
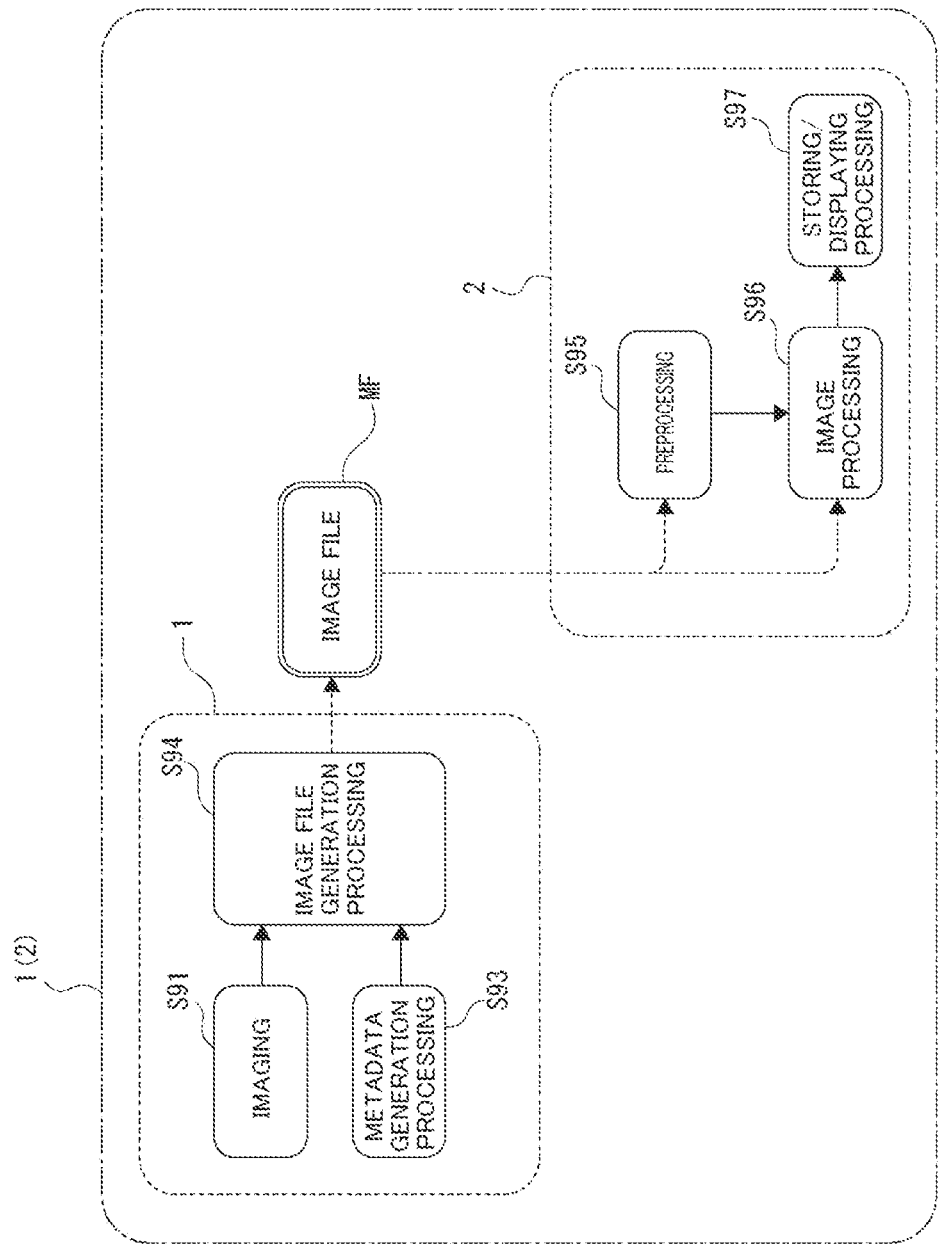
FIG. 8 is an illustrative diagram of an example of a flow of processing of the embodiment.

FIG. 8 illustrates a case in which RAW data is an image processing target as another example.

For example, when the imaging and the image processing are performed by the imaging device 1 and the mobile terminal 2 as indicated by being surrounded by broken lines, the imaging device 1 performs the image file generation processing of step S94 using the captured image signal (RAW data) obtained by the imaging in step S91 and the metadata generated in the metadata generation processing of step S93, to generate the image file MF. In the case of the RAW data, the camera processing described in step S92 in FIGS. 6 and 7 is not performed.

The mobile terminal 2 performs preprocessing (step S95), the image processing (step S96), and the storing and displaying processing (step S97) on such an image file MF.

When the RAW data is an image processing target as illustrated in FIG. 8, a case in which the electrical image stabilization or optical image stabilization is performed in the imaging device 1 is also assumed, and a case in which the electrical image stabilization or optical image stabilization is not performed in the imaging device 1 is also assumed.

In addition, in the cases of FIGS. 6 and 7 in which the camera processing is performed, the case in which the electrical image stabilization or optical image stabilization is performed in the imaging device 1 is also assumed, and the case in which the electrical image stabilization or optical image stabilization is not performed in the imaging device 1 is also assumed.

Further, the imaging device 1 (or the mobile terminal 2) surrounded by an alternate long and short dash line in FIG. 8 indicates a case in which the imaging or the image processing for RAW data is performed in the imaging device 1 (or in the mobile terminal 2).

That is, the preprocessing of step S95, the image processing of step S96, and the storing and display processing of step S97 may be performed in the imaging device 1.

Further, in the mobile terminal 2, the imaging in step S91, the metadata generation processing in step S93, and the image file generation processing in step S94 may be performed.

2. Image File and Metadata

Content of the image file MF and content of the metadata will be described.

Figure 9C:
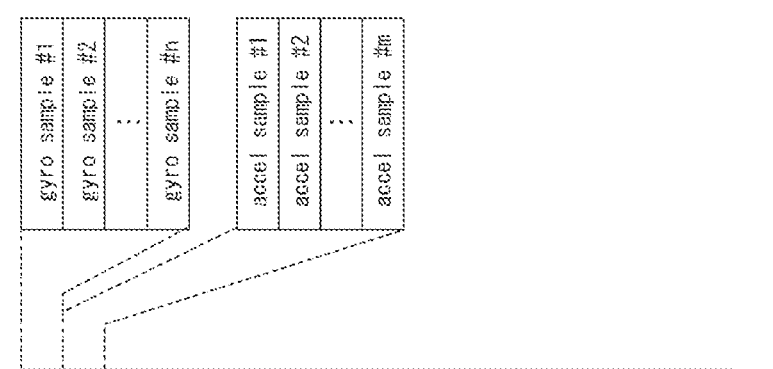
FIGS. 9A, 9B, and 9C are illustrative diagrams of content of an image file and metadata of the embodiment.
Figure 9B:
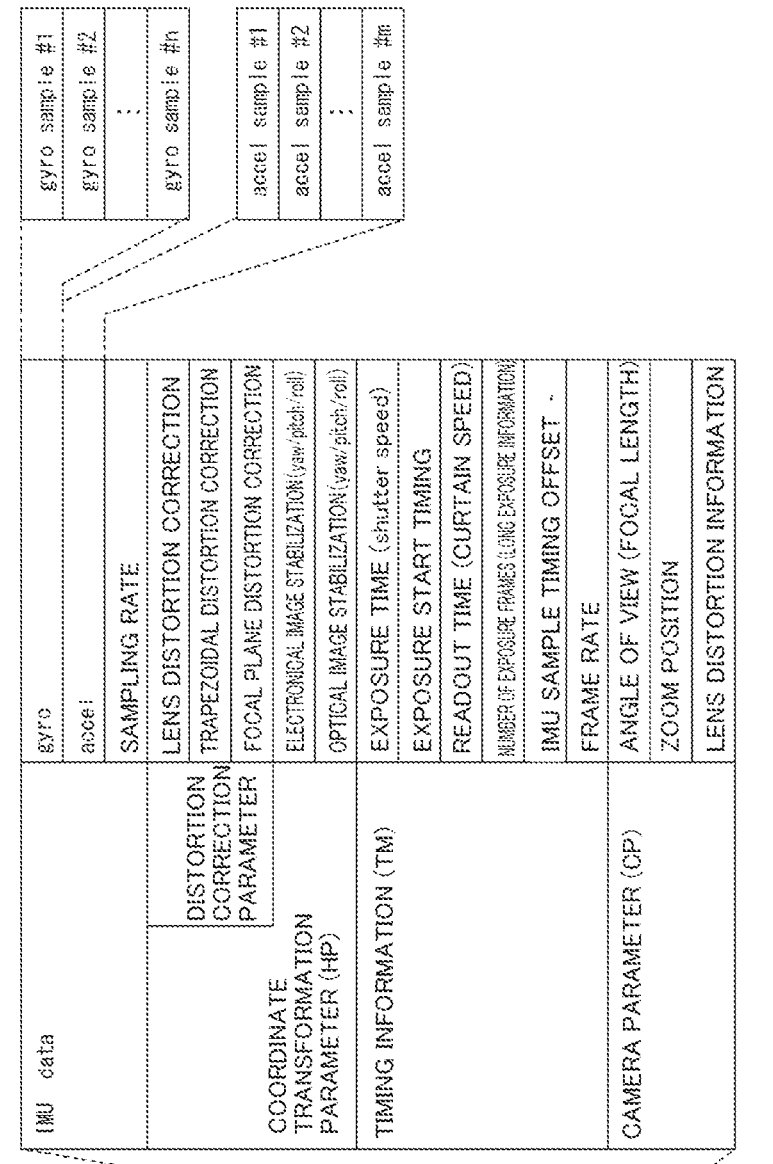
Figure 9A:
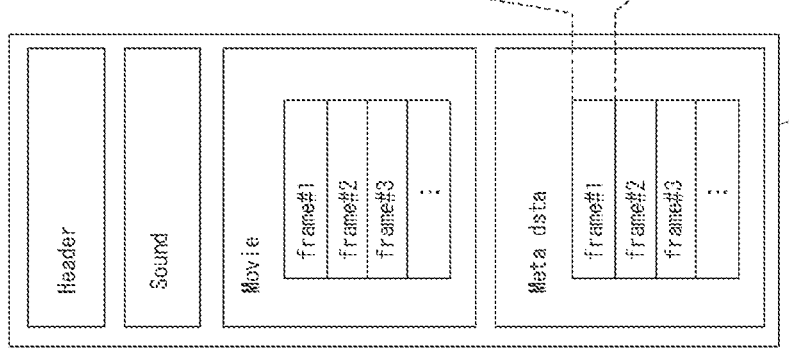

FIG. 9A illustrates data included in the image file MF. As illustrated in FIG. 9A, the image file MF includes various pieces of data as "header", "sound", "movie", and "metadata".

In the "header", for example, information indicating the presence or absence of metadata is described together with information such as a file name and a file size. The "sound" is audio data recorded together with the moving image. For example, 2-channel stereo audio data is recorded.

The "movie" is moving image data, and includes image data as respective frames (#1, #2, #3, . . . ) constituting the moving image.

As the "metadata", additional information associated with the respective frames (#1, #2, #3, . . . ) constituting the moving image is described.

An example of content of the metadata is illustrated in FIG. 9B. For example, IMU data, coordinate transformation parameter HP, timing information TM, and camera parameter CP are described for one frame. These are a part of metadata content, and here, only information related to the image processing to be described below is shown.

As the IMU data, a gyro (angular velocity data), an accelerator (acceleration data), and a sampling rate are described.

The IMU mounted in the imaging device 1 as the sensor unit 23 outputs the angular velocity data and the acceleration data at a predetermined sampling rate.

Generally, this sampling rate is higher than a frame rate of the captured image, so that many IMU data samples can be obtained in one frame period.

Therefore, as the angular velocity data, n samples such as gyro sample #1, gyro sample #2, . . . gyro sample #n illustrated in FIG. 9C are associated with one frame. As the acceleration data, m samples such as accelerator sample #1, accelerator sample #2, . . . accelerator sample #m are associated with one frame.

In some cases, n=m, and in other cases, n≠m.

Although the metadata is described herein in an example in which the metadata is associated with each frame, for example, the IMU data may not be completely synchronized with the frame. In such a case, for example, time information associated with time information of each frame is provided as an IMU sample timing offset in the timing information TM.

The coordinate transformation parameter HP is a general term for parameters that are used for correction with coordinate transformation of each pixel in the image. Further, non-linear coordinate transformation such as lens distortion is also included.

The coordinate transformation parameter HP is a term that can include at least a lens distortion correction parameter, a trapezoidal distortion correction parameter, a focal plane distortion correction parameter, an electrical image stabilization parameter, and an optical image stabilization parameter.

The lens distortion correction parameter is information for directly or indirectly ascertaining how distortion such as barrel aberration and pincushion aberration is corrected and returning to an image before lens distortion correction. Metadata regarding the lens distortion correction parameter as one piece of metadata will be briefly described.

Figure 10A:
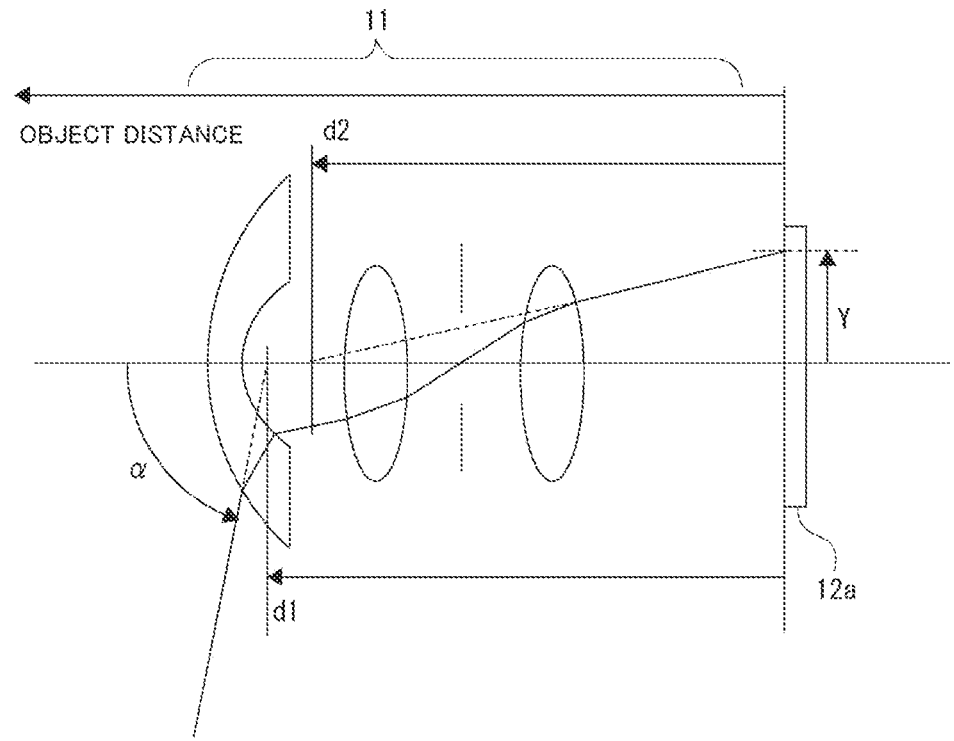
FIGS. 10A and 10B are illustrative diagrams of metadata regarding lens distortion correction.

FIG. 10A illustrates an image height Y, an angle α, an incidence pupil position d1, and an exit pupil position d2 in a schematic diagram of the lens system 11 and the image sensor 12a.

The lens distortion correction parameter is used to know an angle of incidence on each pixel of the image sensor 12a in image processing. Therefore, it is sufficient to know a relationship between the image height Y and the angle α.

Figure 10B:
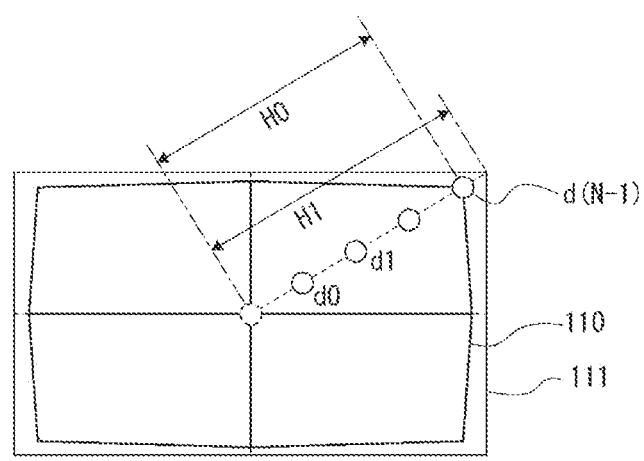

FIG. 10B illustrates an image 110 before lens distortion correction and an image 111 after the lens distortion correction. A maximum image height H0 is a maximum image height before distortion correction, and is a distance from a center to a farthest point of an optical axis. The maximum image height H1 is a maximum image height after distortion correction.

Metadata required to understand a relationship between the image height Y and the angle α is the maximum image height H0 before distortion correction and data d0, d1, . . . d(N−1) of incidence angles with respect to N image heights. It is assumed that "N" is about 10 as an example.

Referring back to FIG. 9B, the trapezoidal distortion correction parameter is a correction amount when trapezoidal distortion caused by shifting the cropping area from a center through the electrical image stabilization is corrected, and is also a value according to a correction amount for the electrical image stabilization.

The focal plane distortion correction parameter is a value indicating an amount of correction for each line with respect to the focal plane distortion.

For the electrical image stabilization and optical image stabilization, the parameter is a parameter indicating an amount of correction in each of axial directions of yaw, pitch, and roll.

The parameters of the lens distortion correction, the trapezoidal distortion correction, the focal plane distortion correction, and the electrical image stabilization are collectively referred to as coordinate transformation parameters, but this is because such correction processing is correction processing for an image formed on each pixel of the image sensor 12a of the imaging element unit 2 and is a parameter of correction processing involving coordinate transformation of each pixel. The optical image stabilization is also one coordinate transformation parameter, but this is because the correction of shake of an inter-frame component in the optical image stabilization is processing involving coordinate transformation of each pixel.

That is, when reverse correction is performed using these parameters, image data subjected to the lens distortion correction, the trapezoidal distortion correction, the focal plane distortion correction, the electrical image stabilization, and the optical image stabilization can be returned to a state before each correction processing, that is, a state when an image is formed on the image sensor 12a of the imaging element unit 12.

Further, respective parameters of the lens distortion correction, the trapezoidal distortion correction, and the focal plane distortion correction are generically called an optical distortion correction parameter because distortion correction processing is for a case in which an optical image itself from the subject is an image captured in an optically distorted state, and each of them is intended for optical distortion correction.

That is, when reverse correction is performed using these parameters, the image data subjected to the lens distortion correction, the trapezoidal distortion correction, and the focal plane distortion correction can be returned to a state before the optical distortion correction.

The timing information TM in the metadata includes respective pieces of information on an exposure time (shutter speed), an exposure start timing, a readout time (curtain speed), the number of exposure frames (long exposure information), an IMU sample offset, and a frame rate.

In the image processing of the embodiment, these are mainly used to associate the line of each frame with the IMU data.

However, even when the image sensor 12a is of a CCD type, correction according to an exposure centroid becomes possible using the exposure start timing and the curtain speed when the exposure centroid shifts using an electronical shutter or a mechanical shutter.

An angle of view (focal length), a zoom position, and lens distortion information are described as the camera parameter CP in the metadata.

3. Overview of Screen Transition

An example of screen transition at the time of image processing in the mobile terminal 2 will be described.

Figure 11:
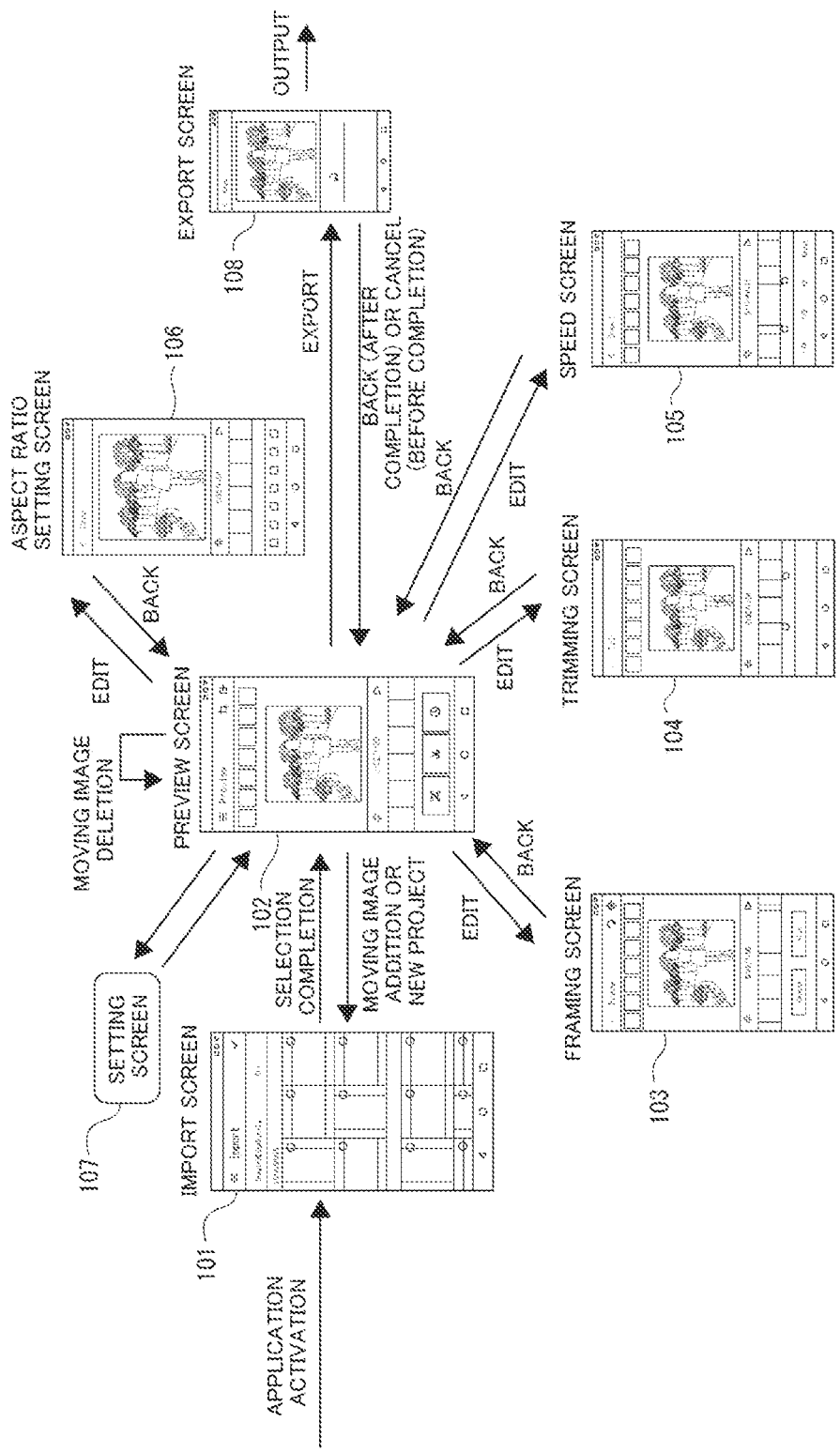
FIG. 11 is an illustrative diagram of screen transition regarding image processing of the embodiment.

FIG. 11 illustrates a transition of various screens appearing on a display screen of the mobile terminal 2. Each screen will be briefly described.

Among respective screens that will be described below, an image that is output on a preview screen 102, a framing screen 103, a trimming screen 104, a speed screen 105, an aspect ratio setting screen 106, and an export screen 108 is an output image oPD subjected to processing of step ST19 in FIG. 14 that will be described below. However, an image that is output on these screens may not always be the output image oPD subjected to the processing in FIG. 14 below, but in this case, an area set or visually recognized by the user and a final area after the processing in FIG. 14 or a degree of distortion may slightly differ from each other.

[Import Screen 101]

When an application program for moving image processing is activated, the import screen 101 appears.

The import screen 101 is a screen before start of moving image processing. A thumbnail and the like of the image file MF are displayed on the import screen 101 so that the user can select the image file MF that is a processing target.

The selected image file MF is imported and preprocessed as the image file MF that is a processing target.

[Preview Screen 102]

The user completes an operation for selecting one or a plurality of image file MFs on the import screen 101, so that the display transitions to the preview screen 102 through import processing. On the preview screen 102, a list of imported moving images (image file MF) that can be subjected to image processing is displayed, and preview playback of a designated moving image in the list becomes possible.

The user can perform operations for various types of image processing starting from the preview screen, such as an operation for changing brightness or changing the color, on the image file MF shown on the preview screen 102.

On the preview screen 102, the user can perform operations such as playback of a selected moving image (image file MF), addition or deletion of the moving image, and resetting of the image processing.

The moving image playback is performed on the preview screen 102.

When addition of a moving image that is an image processing target or an operation with respect to a new project (new image processing action) is performed, the display returns to the import screen 101 and selection is enabled. The moving image deletion (exclusion from the image processing target) can be performed on the preview screen 102.

[Framing Screen 103]

A predetermined operation from the preview screen 102 causes the display to transition to the framing screen 103. The framing screen 103 is a screen for individually framing moving images designated as the processing targets on the preview screen 102 among the imported moving images.

On the framing screen 103, for example, the user can perform operations such as designation of the effective cropping area of the image, enlargement and reduction of the image, rotation of the image, designation of the tracking target, and designation of the disposition position of the tracking target inside the screen in a state in which a still image of a certain frame of the moving image that is a processing target is displayed.

Thereafter, the display returns to the preview screen 102 according to a predetermined operation from the framing screen 103.

An image displayed on the framing screen 103 is an entire image of a certain frame (a first frame of the moving image, a paused frame, or the like), or a part cropped from the entire image. The user can move the displayed range up, down, left, or right or perform enlargement, reduction, and rotation operations to designate the effective cropping area of the image.

Figure 12A:
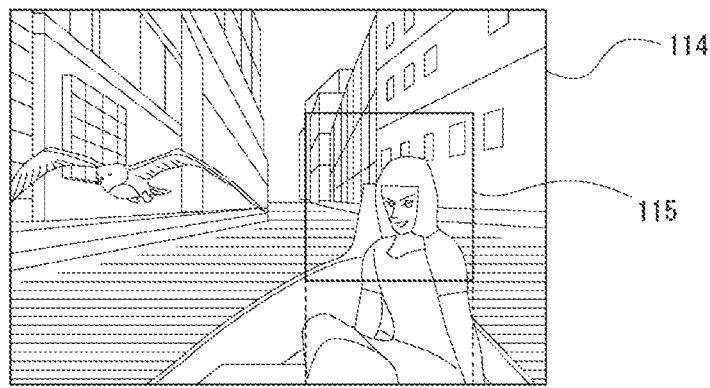
FIGS. 12A, 12B, and 12C are illustrative diagrams for cropping area designation of the embodiment.

An example will be given. FIG. 12A illustrates an entire image 114 of a certain frame and a display frame 115. It is assumed that a range of the display frame 115 is a range that is displayed on the framing screen 103. That is, a part of the entire image 114 is cropped and displayed on the framing screen 103. The range of the display frame 115 corresponds to the effective cropping area.

The user performs, for example, a dragging operation or a pinch-out or pinch-in operation on the framing screen 103, making it possible to move, or enlarge, reduce or rotate a range included in the display frame 115.

Figure 12B:
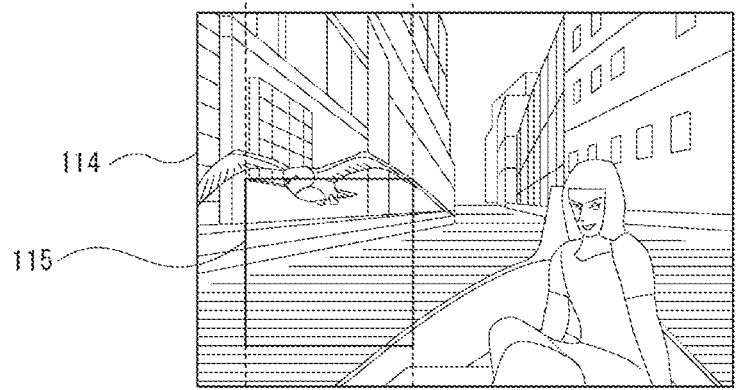

For example, a dragging operation on the screen moves the range included in the display frame 115 as illustrated in FIGS. 12A and 12B. That is, the image is moved up, down, left, or right with respect to the display frame 115, which changes a displayed range.

Figure 12C:
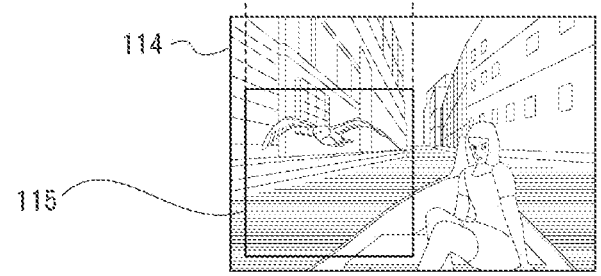

Further, when the user instructs the enlargement or reduction of the image through, for example, the pinch-out or pinch-in operation, the range included in the display frame 115 changes. For example, when the reduction operation is performed from FIG. 12B, a result thereof is as illustrated in FIG. 12C. That is, the entire image 114 is reduced with respect to the display frame 115 and the range of the subject included in the display frame 115 is widened so that the image included in the display frame 115 (viewed by the user) is reduced. That is, the displayed image is reduced, so that a wider range is displayed.

Although not illustrated, conversely, when the user performs an enlargement operation, the entire image 114 is enlarged with respect to the display frame 115, and the range of the subject included in the display frame 115 is narrowed. That is, a narrower range is enlarged and displayed.

An operation with respect to such a range displayed by the display frame 115 is an operation for designating the cropping area, which is performed by the user.

Further, the user can designate the effective cropping area as described above and designate the tracking target and the disposition position thereof.

Figure 13A:
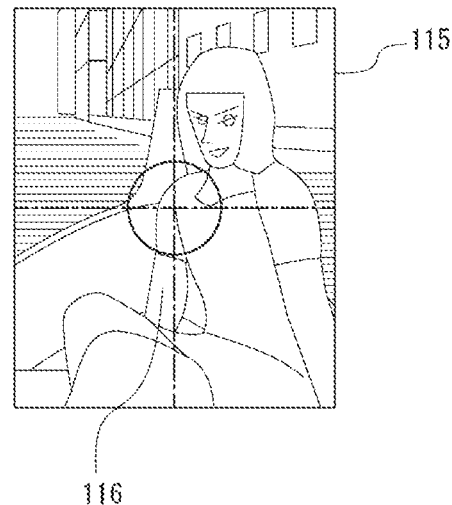
FIGS. 13A and 13B are illustrative diagrams of tracking designation of the embodiment.

For example, when the user performs an operation for designating the tracking target on the framing screen 103, a target designation aiming 116 is displayed as illustrated in FIG. 13A. The user can arbitrarily designate a position of the target designation aiming through a dragging operation, a tapping operation, or the like. For example, it is possible to designate a portion of a face of a person as illustrated in FIG. 13B.

Figure 13B:
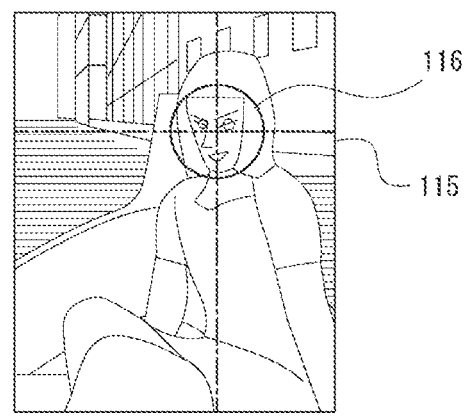

In a state of FIG. 13B, the face of the person is designated as the tracking target, and the disposition position within the screen of the tracking target is designated so that the tracking target is disposed on the upper right side within the screen.

That is, on the framing screen 103, the effective cropping area can be designated through a selection of the range included in the display frame 115, and a combination of the range included in the display frame 115 with an operation for designating the tracking target makes the operation for designating the tracking target and the disposition position thereof possible.

The above operation is performed as an operation on the displayed still image of one frame, but the designation is reflected in other frames in the same moving image. When the tracking target is not designated only by moving, enlarging, reducing, and rotating the image range in the display frame 115, a range designated through operations for moving, enlarging, reducing, and rotating the image range is a fixed effective cropping area in each frame.

On the other hand, when the tracking target and the disposition position thereof has been designated together with the image range that is included in the display frame as described above, the effective cropping area is calculated for the other frames within the moving image according to the designation. That is, in each of frames constituting the moving image, since a position within the screen of the tracking target also changes, the effective cropping area is calculated and changed for each frame.

Specifically, in each frame, the effective cropping area is calculated so that the designated tracking target is located at the designated disposition position in a size of the effective cropping area designated by an operation for enlarging or reducing the display frame 115.

The size of the effective cropping area may be appropriately changed depending on change in size of the tracking target.

On the framing screen 103, operations for moving, enlarging, reducing, and rotating the range included in the display frame 115 while playing back and displaying the moving image may be performed or the operation for designating the tracking target or the disposition position thereof may be performed.

[Trimming Screen 104]

A predetermined operation from the preview screen 102 causes the display to transition to the trimming screen 104. The trimming screen 104 is a screen for individually trimming (cutting in a time axis direction) the moving image designated as the processing target on the preview screen 102 among the imported moving images.

On the trimming screen 104, a range to be trimmed in the moving image can be selected. For example, a bar is displayed in the time axis direction of the moving image and an operation can be performed to designate a start point and an end point of the range to be cut.

The display returns to the preview screen 102 according to a predetermined operation from the trimming screen 104.

In this specification, trimming does not include processing of cropping a partial area in one frame.

[Speed Screen 105]

A predetermined operation from the preview screen 102 causes the display to transition to the speed screen 105. The speed screen 105 is a screen for individually speed-processing the moving images designated as the processing targets on the preview screen 102 among the imported moving images.

For example, on the speed screen 105, an operation can be performed to select a range for setting a speed (playback speed) in the moving image or to designate the playback speed in the range.

The display returns to the preview screen 102 according to a predetermined operation from the speed screen 105.

More specifically, the speed is a playback speed for performing slow motion or high-speed playback by setting a frame rate different from a frame rate set in the timing information TM included in the metadata.

[Aspect Ratio Setting Screen 106]

A predetermined operation from the preview screen 102 causes the display to transition to the aspect ratio setting screen 106. The aspect ratio setting screen 106 is a screen for setting an aspect ratio of an output moving image in units of files with respect to the imported moving image.

When aspect ratios of the imported moving image and the set output image (output moving image) differ, there may be the same meaning as that of the setting of the effective cropping area that is performed in the framing screen.

That is, even when the effective cropping area is not set on the framing screen, an effective cropping area of the output image having a different aspect ratio is set from the imaged area.

For example, an aspect ratio such as "1:1", "4:5", "5:4", "16:9", and "9:16" can be selected on the aspect ratio setting screen 106.

The display returns to the preview screen 102 according to a predetermined operation from the aspect ratio setting screen 106.

All or some of functions of the aspect ratio setting screen 106, for example, a batch selection operation of the aspect ratios may be enabled by, for example, a dialog displayed on the preview screen 102.

Further, the aspect ratio setting screen 106 may be used as a screen for setting an aspect ratio of all of a plurality of frames constituting the moving image designated as the processing target on the preview screen 102 among the imported moving images.

[Setting Screen 107]

A predetermined operation from the preview screen 102 causes the display to transition to the setting screen 107. On the setting screen 107, a setting operation for, for example, an operation of the application program is enabled.

The display returns to the preview screen 102 according to a predetermined operation from the setting screen 107.

[Export Screen 108]

A predetermined operation from the preview screen 102 causes the display to transition to the export screen 108. The export screen 108 is a screen when processing of exporting a moving image reflecting the image processing content performed on each of the above screens is being performed. That is, after the user performs operations of various types of image processing, the user returns to the preview screen 102 and instructs export. Accordingly, the display transitions to the export screen 108, and an export processing of the moving image processed according to the image processing content is executed.

The exported moving image can be arbitrarily recorded by the user or uploaded to a website, social networking service (SNS), or the like via network communication of the mobile terminal 2 and shared.

When the user performs a cancel operation during the export processing, or when the export processing is completed, the display returns to the preview screen 102.

4. Image Processing

A specific example of processing regarding a moving image that is executed while performing the user interface on each screen will be described.

Figure 14:
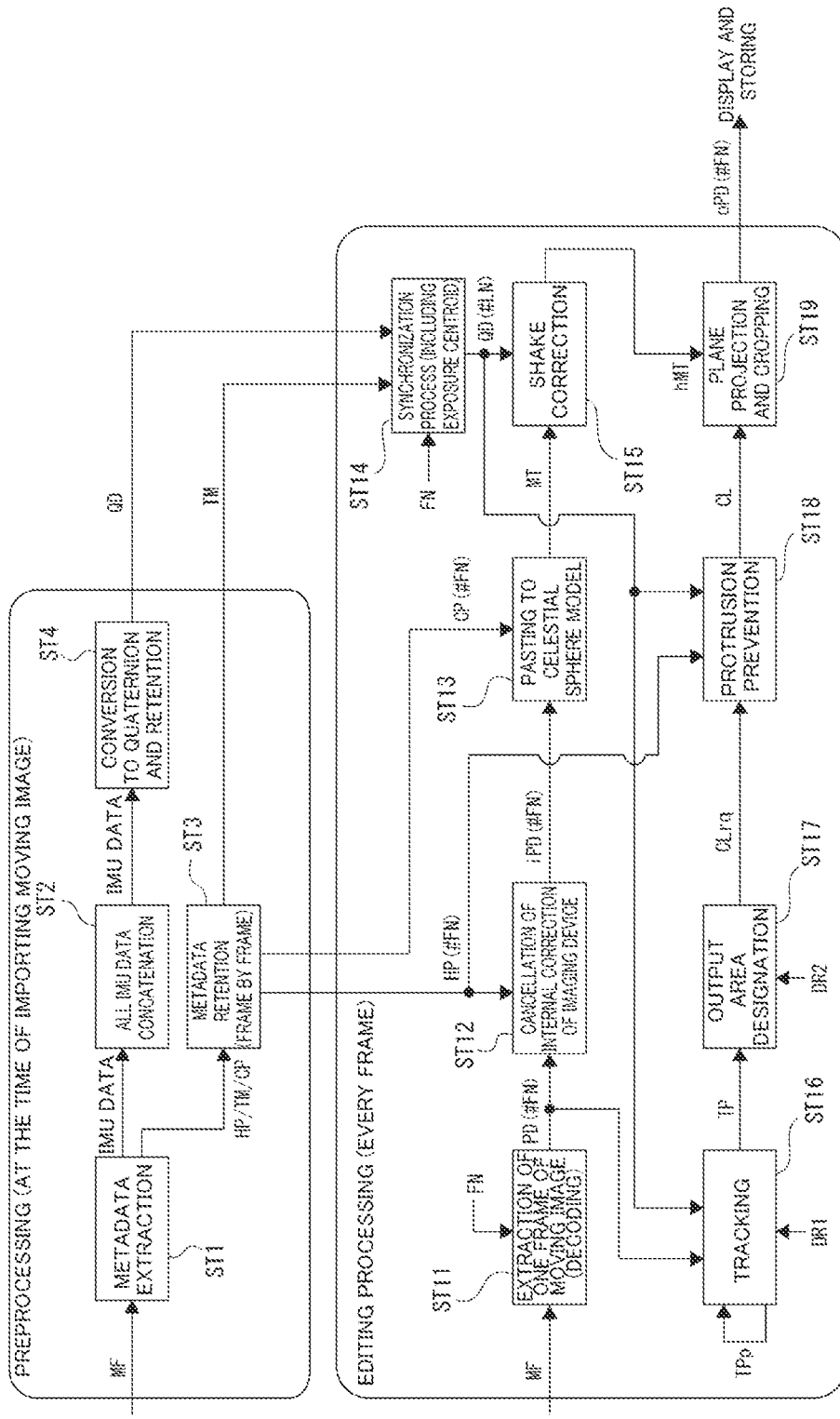
FIG. 14 is an illustrative diagram of image processing of the embodiment.

FIG. 14 illustrates a procedure as preprocessing that is performed at the time of importing the moving image (image file MF) by the preprocessing unit 31 (CPU 71) of FIG. 5 and a procedure as image processing that is performed by the image processing unit 32 (CPU 71), and illustrates a relationship between pieces of information that are used in the respective processing.

First, preprocessing will be described. The preprocessing is performed on the image file MF selected as the image processing target on the import screen 101. In this preprocessing, metadata extraction (step ST1), concatenation of all pieces of IMU data (step ST2), metadata holding (step ST3), conversion to quaternion (posture information of the imaging device 1), and holding (step ST4) are performed.

As the metadata extraction in step ST1, the preprocessing unit 31 reads the image file MF that is a target and extracts the metadata included in the image file MF as described with reference to FIGS. 9A, 9B, and 9C.

Some or all of steps ST1, ST2, ST3, and ST4 may be performed on the imaging device 1 side. In this case, in the preprocessing, content after processing to be described below is acquired as metadata.

The preprocessing unit 31 performs concatenation processing on the IMU data (angular velocity data (gyro sample) and the acceleration data (accelerator sample)) in the extracted metadata in step ST2.

This is processing of arranging and concatenating all pieces of IMU data associated with all the frames in chronological order to construct IMU data corresponding to an entire sequence of moving image.

Integration processing is performed on the concatenated IMU data to calculate a quaternion QD indicating the posture of the imaging device 1 at each point in time on a sequence of moving images, and store and hold the quaternion QD. The calculation of the quaternion QD is an example.

It is also possible to calculate the quaternion QD using only the angular velocity data.

The preprocessing unit 31 performs processing of holding the metadata other than the IMU data, that is, the coordinate transformation parameter HP, the timing information TM, and the camera parameter CP among the extracted metadata in step ST3. That is, the coordinate transformation parameter HP, the timing information TM, and the camera parameter CP are stored in a state corresponding to each frame.

The above preprocessing is performed to allow various types of image processing to be performed via an interface using each screen starting from the preview screen 102 described above.

The image processing of FIG. 14 indicates processing that is normally performed when the moving image of the image file MF or the paused still image is played back on each screen as the preview screen 102, the framing screen 103, the trimming screen 104, the speed screen 105, and the aspect ratio setting screen 106 while reflecting information of the effective cropping area designated by the user on the framing screen 103.

The image processing unit 32 (CPU 71) performs respective processing including extraction of one frame of moving image (step ST11), cancellation of internal correction of the imaging device (step ST12), pasting to the celestial sphere model (step ST13), synchronization processing (step ST14), and shake correction (ST15). The processing of steps ST11 to ST15 is processing using a function of the shake correction unit 33 of FIG. 5.

Further, the image processing unit 32 (CPU 71) performs respective processing that are tracking (step ST16), output area designation (step ST17), and protrusion prevention (step ST18). The processing of steps ST16, ST17, and ST18 is processing using functions of the effective cropping area setting unit 34 of FIG. 5. Further, the image processing unit 32 (CPU 71) performs processing of plane projection and cropping (step ST19). The processing of step ST19 is processing using the function of the effective cropping area image generation processing unit 35 in FIG. 5.

The image processing unit 32 performs each processing of steps ST11 to ST19 above on each frame at the time of playback of the image of the image file MF. For example, when an image is displayed on each screen such as the framing screen 103 or trimming screen 104 described above, each processing of steps ST11 to ST19 is performed on each frame.

In step ST11, the image processing unit 32 decodes one frame of the moving image (image file MF) along a frame number FN. Image data PD (#FN) of one frame is output. "(#FN)" indicates a frame number and indicates that information corresponds to such a frame.

When the moving image is not subjected to encoding processing such as compression, the decoding processing in step ST11 is unnecessary.

In step ST12, the image processing unit 32 performs processing of canceling the internal correction performed on the image data PD (#FN) of one frame by the imaging device 1. Therefore, reverse correction of the correction performed by the imaging device 1 is performed by referring to a coordinate transformation parameter HP (#FN) stored in correspondence to the frame number (#FN) at the time of preprocessing. Accordingly, image data iPD (#FN) in a state in which the lens distortion correction, the trapezoidal distortion correction, the focal plane distortion correction, the electrical image stabilization, and the optical image stabilization have been canceled in the imaging device 1 is obtained.

In step ST13, the image processing unit 32 performs pasting of image data iPD (#FN) of one frame that is in a state in which various corrections have been canceled, to the celestial sphere model. In this case, the camera parameter CP (#FN) stored in correspondence to the frame number (#FN), that is, the angle of view, the zoom position, and the lens distortion information are referred to.

Figure 15A:
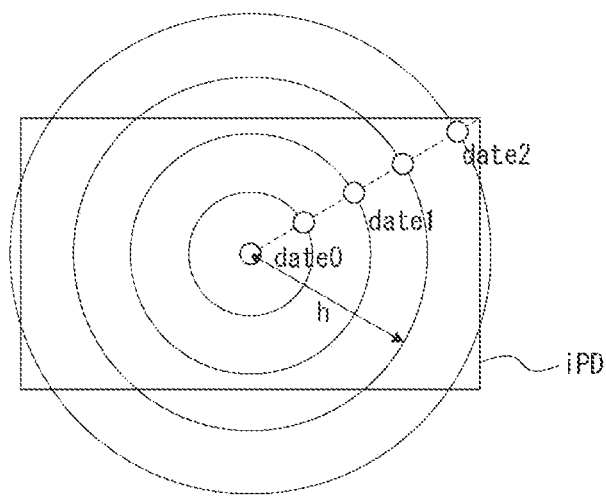
FIGS. 15A, 15B, and 15C are illustrative diagrams of pasting to a celestial sphere model of the embodiment.
Figure 15B:
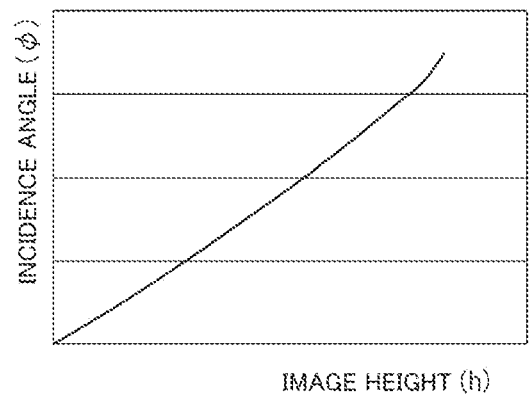
Figure 15C:
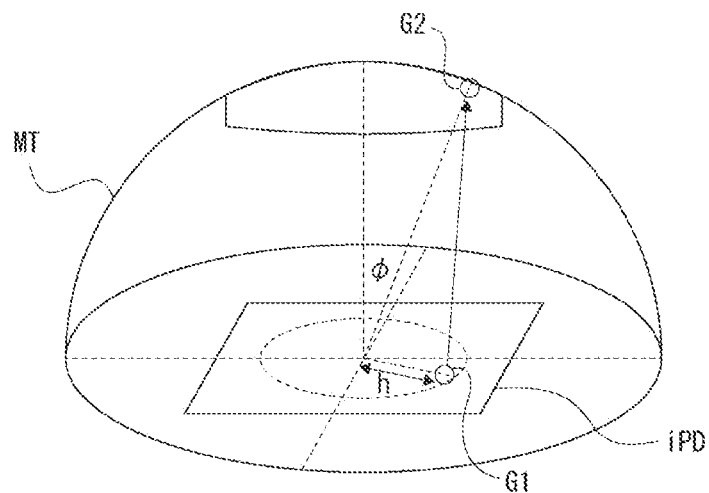

FIGS. 15A, 15B, and 15C illustrate an overview of pasting to the celestial sphere model.

Image data iPD is illustrated in FIG. 15A. An image height h is a distance from a center of the image. Each circle in FIG. 15A indicates a position in which the image height h is equal.

A "relationship between an image sensor surface and an incidence angle φ" in the frame is calculated from the angle of view, zoom position, and lens distortion information for the frame of this image data iPD, and "data0" . . . "dataN–1" at respective positions on the image sensor surface are obtained. A one-dimensional graph of the relationship between the image height h and the incidence angle φ as illustrated in FIG. 15B is represented from "data0" . . . "dataN–1". The incidence angle φ is an angle of a light ray (an angle seen from the optical axis).

This one-dimensional graph is rotated once around a center of the captured image, and a relationship between each pixel and the incidence angle is obtained.

Accordingly, each pixel of the image data iPD is mapped to a celestial sphere model MT, like a pixel G2 at celestial sphere coordinates from a pixel G1 in FIG. 15C.

Accordingly, an image (data) of the celestial sphere model MT in which the captured image is pasted to an ideal celestial spherical surface in a state in which lens distortion has been removed can be obtained. This celestial sphere model MT is a model in which a unique parameter or distortion of the imaging device 1 that has originally captured the image data iPD is removed and a range seen by an ideal pinhole camera is pasted on a celestial spherical surface.

Therefore, the image of the celestial sphere model MT is rotated in a predetermined direction in this state, such that the shake correction can be realized.

Here, the posture information (quaternion QD) of the imaging device 1 is used for the shake correction. Therefore, the image processing unit 32 performs a synchronization processing in step S14.

In the synchronous processing, processing of specifying and acquiring a quaternion QD (#LN) suitable for each line in correspondence to the frame number FN is performed. "(#LN)" indicates a line number in the frame and indicates that information corresponds to the line.

The quaternion QD (#LN) for each line is used because an amount of shake differs for each line when the image sensor 12a is of a CMOS type and imaging using a rolling shutter scheme is performed.

For example, when the image sensor 12a is of a CCD type and imaging using a global shutter scheme is performed, a frame-by-frame quaternion QD (#FN) may be used.

In the case of a global shutter of the CCD or CMOS type image sensor as the image sensor 12a, a centroid is shifted when an electronical shutter (or a mechanical shutter) is used, and thus, a quaternion at a timing at a center of an exposure period of the frame (which is shifted depending on a shutter speed of the electronical shutter) may be used.

Here, blur appearing in the image is considered.

The blur is image bleeding due to relative motion between the imaging device and the subject in the same frame. That is, this is image bleeding due to shake within the exposure time. When the exposure time becomes longer, an influence of the bleeding as the blur is stronger.

In the electrical image stabilization, when a scheme for controlling the image range to be cropped for each frame is used, "shake" occurring between frames can be reduced or eliminated, but relative shake within the exposure time cannot be reduced by the electrical image stabilization.

Further, when the cropping area is changed due to the image stabilization, posture information of each frame is used, but when the posture information deviates from a center of the exposure period such as a start or end timing of the exposure period, a direction of shake within the exposure time based on the posture is biased, and bleeding is easily noticeable. Further, the exposure period differs for each line in a rolling shutter of the CMOS type image sensor.

Therefore, in the synchronization processing of step ST14, the quaternion QD is acquired for each frame of the image data on the basis of the timing of the exposure centroid for each line.

Figure 16:
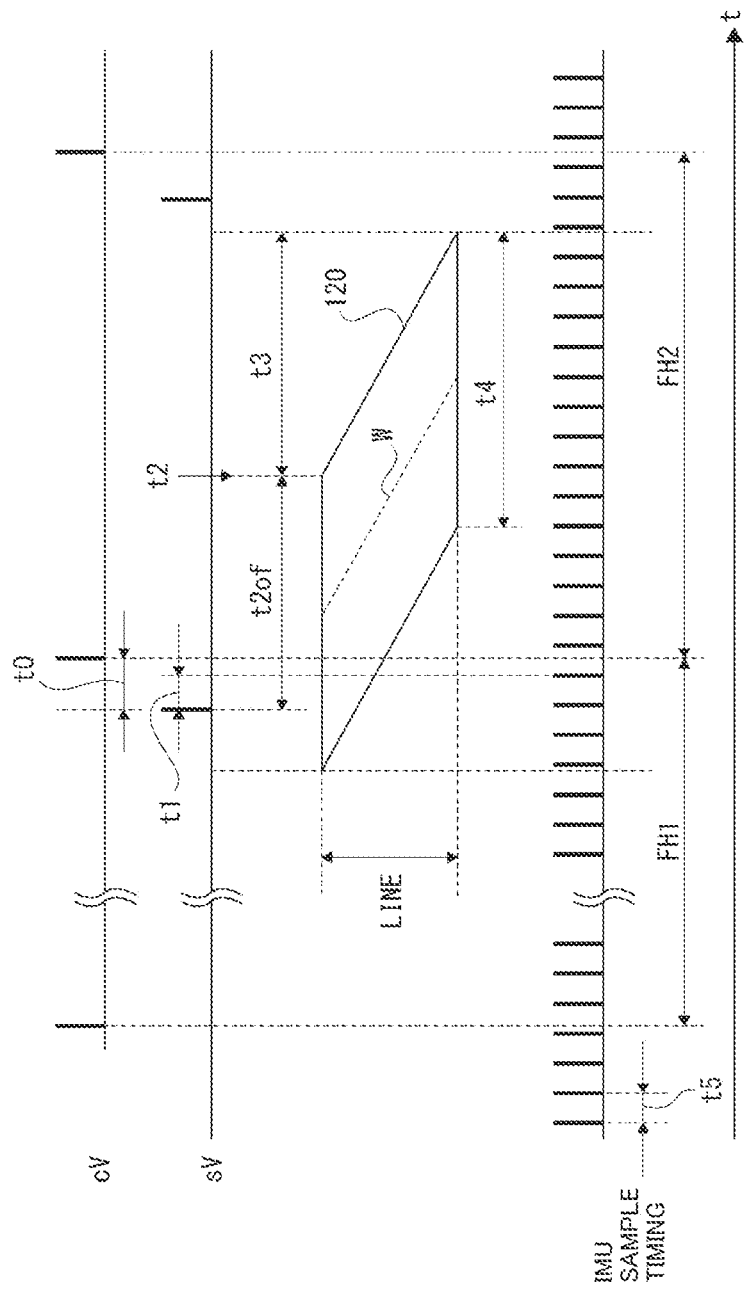
FIG. 16 is an illustrative diagram of a sample timing of IMU data of the embodiment.

FIG. 16 illustrates a synchronization signal cV of the imaging device 1 in a vertical period, a synchronization signal sV of the image sensor 12a generated from the synchronization signal cV, and a sample timing of the IMU data, and also illustrates an exposure timing range 120.

The exposure timing range 120 is a range schematically indicating, in a parallelogram, an exposure period of each line of one frame when the exposure time is t4 in the rolling shutter scheme. Further, a temporal offset t0 of the synchronization signal cV and the synchronization signal sV, an IMU sample timing offset t1, a readout start timing t2, a readout time (curtain speed) t3, and an exposure time t4 are shown. The readout start timing t2 is a timing at which a predetermined time t2 of has passed from the synchronization signal sV.

Each piece of IMU data obtained at each IMU sample timing is associated with the frame. For example, the IMU data in a period FH1 is metadata associated with the current frame indicating the exposure period in a parallelogram, and the IMU data in the period FH1 is metadata associated with the next frame. However, by concatenating all pieces of IMU data in step ST2 of FIG. 14, the association between each frame and the IMU data is released so that the IMU data can be managed in chronological order.

In this case, the IMU data corresponding to an exposure centroid (timing indicated by a broken line W) of each line of the current frame is specified. This can be calculated when a temporal relationship between the IMU data and an effective pixel area of the image sensor 12a is known.

Therefore, IMU data corresponding to the exposure centroid (the timing indicated by the broken line W) of each line is specified using information that can be acquired as the timing information TM corresponding to the frame (#FN).

That is, the information is information on the exposure time, the exposure start timing, the readout time, the number of exposure frames, the IMU sample offset, and the frame rate.

The quaternion QD calculated from the IMU data of the exposure centroid is specified and used as the quaternion QD (#LN) which is the posture information for each line.

This quaternion QD (#LN) is provided to the shake correction in step S15.

In the shake correction in step S15, the image processing unit 32 rotates the image of the celestial sphere model MT to which the image of the frame has been pasted in step S14 so that a change in posture (shake) is canceled using the quaternion QD (#LN) for each line, to perform the shake correction. An image of the celestial sphere model hMT subjected to the shake correction is sent to the processing of step ST19.

In step ST19, the image processing unit 32 projects the image of the celestial sphere model hMT subjected to the shake correction onto a plane and crops the image to obtain an image (output image data oPD) subjected to the shake correction.

In this case, the shake correction is realized through the rotation of the celestial sphere model MT, and use of the celestial sphere model MT prevents a trapezoidal shape from being formed regardless of a cropped portion, and as a result, the trapezoidal distortion is also eliminated. Further, in the celestial sphere model MT, because the range seen by the ideal pinhole camera is pasted to the celestial spherical surface as described above, there is no lens distortion. Rotation of the celestial sphere model MT is performed according to the quaternion QD (#LN) for each line, which eliminates the focal plane distortion correction.

Further, since the quaternion QD (#LN) corresponds to the exposure centroid of each line, an image in which the blur is not noticeable is obtained.

Association between the image after the plane projection in step S19 and the celestial sphere model MT is as follows.

Figure 17A:
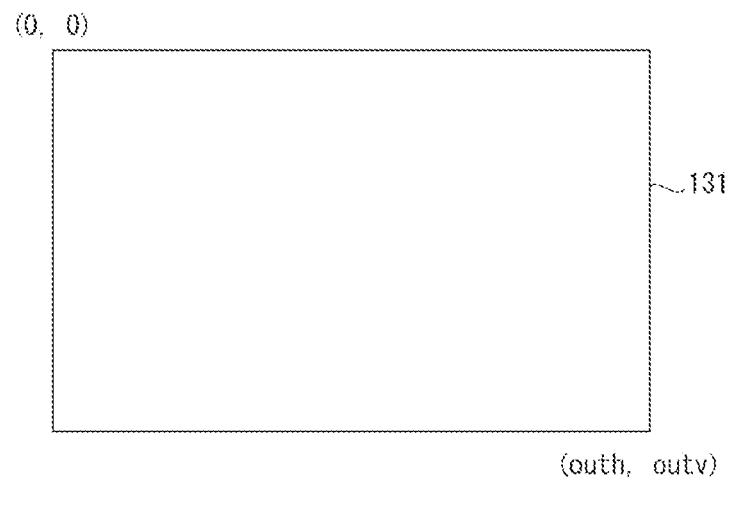
FIG. 17A and 17B are illustrative diagrams of association between an output image and the celestial sphere model of the embodiment.

FIG. 17A illustrates an example of a rectangular coordinate plane 131 subjected to plane projection. Coordinates of the image subjected to the plane projection are (x, y).

Figure 17B:
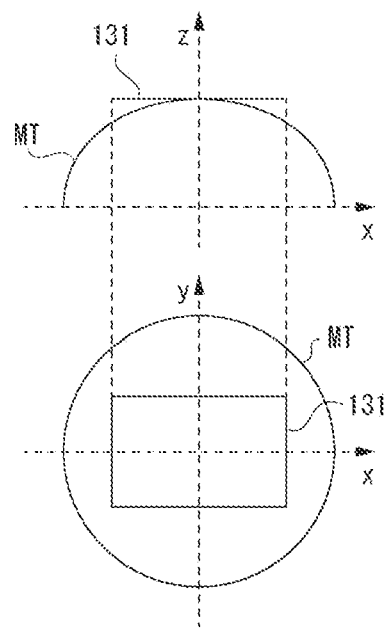

As illustrated in FIG. 17B, the coordinate plane 131 is disposed (normalized) in a three-dimensional space so that the coordinate plane 131 comes in contact with the celestial sphere model MT on the celestial sphere model MT and at a center of the celestial sphere model MT. That is, a center of the coordinate plane 131 is disposed at a position that matches a center of the celestial sphere model MT and is in contact with the celestial sphere model MT.

In this case, coordinates are normalized on the basis of a zoom magnification or a size of the effective cropping area CL. For example, when a horizontal coordinate of the coordinate plane 131 is 0 to outh and a vertical coordinate is 0 to outv as illustrated in FIG. 17A, outh and outv are an image size. For example, the coordinates are normalized using the following equation.

$$x_{norm} = \frac{1}{zoom} \cdot \frac{(x - outh/2)}{r} \quad \text{[Math. 1]}$$
$$y_{norm} = \frac{1}{zoom} \cdot \frac{(y - outv/2)}{r}$$
$$z_{norm} = 1$$
$$\text{WHERE, } r = \min(outh, outv)/2$$

In (Math. 1) above, min (A, B) is a function of returning a smaller value of A and B. Further, "zoom" is a parameter for controlling enlargement and reduction. Further, xnorm, ynorm, and znorm are normalized x, y, and z coordinates. According to each of the above equations of (Math. 1) above, coordinates of the coordinate plane 131 are normalized to coordinates on a spherical surface of a hemisphere having a radius of 1.0.

Figure 18A:
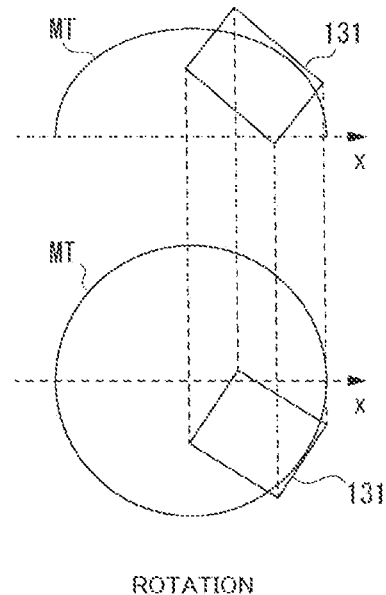
FIGS. 18A and 18B are illustrative diagrams of rotation and perspective projection of an output coordinate plane of the embodiment.

For rotation for obtaining a direction of the effective cropping area CL, the coordinate plane 131 is rotated through rotation matrix calculation, as illustrated in FIG. 18A. That is, a rotation matrix of (Math. 2) below is used to rotate a pan angle, tilt angle, and roll angle. Here, the pan angle is a rotation angle at which the coordinates are rotated around a z-axis. Further, the tilt angle is a rotation angle at which the coordinates are rotated around an x-axis, and the roll angle is a rotation angle at which the coordinates are rotated around a y-axis.

$$\begin{pmatrix} x_{rot} \\ y_{rot} \\ z_{rot} \end{pmatrix} = \begin{pmatrix} 1 & 0 & 0 \\ 0 & \cos R_t & -\sin R_t \\ 0 & \sin R_t & \cos R_t \end{pmatrix} \quad \text{[Math. 2]}$$
$$\begin{pmatrix} \cos R_r & 0 & -\sin R_r \\ 0 & 1 & 0 \\ \sin R_r & 0 & \cos R_r \end{pmatrix} \begin{pmatrix} \cos R_p & -\sin R_p & 0 \\ \sin R_p & \cos R_p & 0 \\ 0 & 0 & 1 \end{pmatrix} \begin{pmatrix} x_{norm} \\ y_{norm} \\ z_{norm} \end{pmatrix}$$

In (Math. 2) above, "Rt" is the tilt angle, "Rr" is the roll angle, and "Rp" is the pan angle. Further, (xrot, yrot, zrot) are coordinates after rotation.

These coordinates (xrot, yrot, zrot) are used to calculate celestial sphere correspondence points in perspective projection.

Figure 18B:
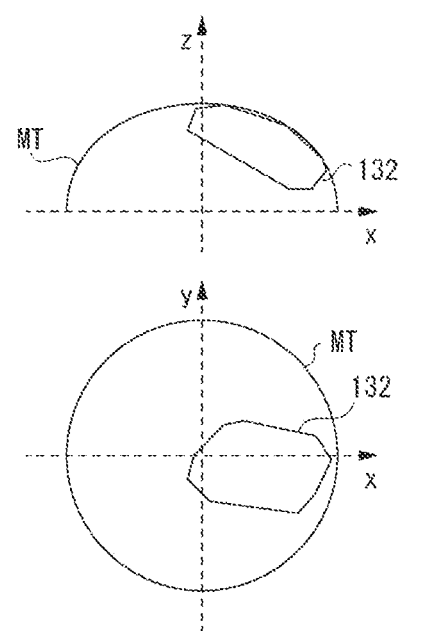

As illustrated in FIG. 18B, the coordinate plane 131 is perspectively projected onto a surface of the celestial sphere (area 132). That is, when a straight line is drawn from the coordinate toward a center of the celestial sphere, a point intersecting the spherical surface is obtained. Each coordinate is calculated as follows.

$$x_{sph} = x_{rot}/\sqrt{x_{rot}^2 + y_{rot}^2 + z_{rot}^2}$$

$$y_{sph} = y_{rot}/\sqrt{x_{rot}^2 + y_{rot}^2 + z_{rot}^2}$$

$$z_{sph} = z_{rot}/\sqrt{x_{rot}^2 + y_{rot}^2 + z_{rot}^2} \qquad \text{[Math. 3]}$$

In (Math. 3), xsph, ysph, and zsph are coordinates in which coordinates on the coordinate plane 131 are projected on to the coordinates on the surface of the celestial sphere model MT.

Image data subjected to plane projection can be obtained in this relationship.

The above has been described without considering the processing of the effective cropping area setting unit 34 but, for example, the effective cropping area for the image projected onto the plane using the above scheme are set in the processing of steps ST16, ST17, and ST18 of FIG. 14.

The image processing unit 32 performs tracking as step ST16.

This tracking processing is processing of detecting the position of the tracking target designated by the operation information DR1 of the user in the image data PD (#FN) of the current frame.

The operation information DR1 is information on an operation for designating the tracking target by operating the target designation aiming 116 on the framing screen 103 as described with reference to FIG. 13.

When the operation for designating the tracking target is performed, the image processing unit 32 recognizes a designated subject and stores the subject as the tracking target. Thereafter, processing of determining the position of the tracking target in the screen is performed for each frame.

The determination of the position of the tracking target in the screen is made through a subject determination (for example, face determination or person determination) based on image analysis, or made by using an in-screen position information TPp of the tracking target in a previous frame.

The in-screen position information TP of the tracking target in the image data PD (#FN) of the current frame that has been determined is provided to the processing of step S17. The in-screen position information TP may be information indicating a range in which the tracking target is imaged in a coordinate system of the current frame, using the coordinate values.

In step ST17, the image processing unit 32 performs output area designation. This is processing of setting a requested cropping area CLrq according to operation information DR2 of a user operation. The processing can be said as processing of designating an area of the image to be finally displayed as an output image, as the requested cropping area CLrq.

The setting of the requested cropping area CLrq here means provisional setting (a candidate for the effective cropping area CL as an area actually subjected to cropping processing) before processing of the next step ST18 is performed. This step ST17 is processing of designating the effective cropping area CL on the basis of the user operation or the information on the tracking target, but the effective cropping area CL before the correction in the protrusion prevention processing to be described below is called the requested cropping area CLrq.

For example, there is also a case in which the requested cropping area CLrq set in step ST17 becomes the effective cropping area CL as it is, such as a case in which the protrusion prevention processing is not performed or a case in which the protrusion prevention processing is performed but no substantial correction is performed.

Operation information DR2 input by the user includes information on an operation for designating the effective cropping area CL, an operation for selecting the aspect ratio, and an operation for designating the tracking target disposition position.

Operation information of the operation for designating the effective cropping area is information on the operation for designating the range inside the display frame 115 on the framing screen 103 as described with reference to FIGS. 12A, 12B, and 12C.

Operation information of the operation for selecting the aspect ratio is operation information of the aspect ratio selected on the aspect ratio setting screen 106. Selection on the aspect ratio setting screen 106 causes, for example, the aspect ratio of the display frame 115 on the framing screen 103 or the like to be changed, so that the user can designate an arbitrary aspect ratio and then designate the effective cropping area on the framing screen 103 in a state of the aspect ratio.

The operation information of the operation for designating the tracking target disposition position is information on the operation for designating the disposition position of the tracking target in the screen as illustrated in FIG. 13B.

The information on the disposition position of the tracking target may be a coordinate value of a coordinate system in the fixed display frame 115 having the selected aspect ratio, not a coordinate system within a frame of the image data PD.

In step S17, the image processing unit 32 sets the requested cropping area CLrq using the operation information DR2 and the in-screen position information TP of the tracking target.

Specifically, for example, a coordinate range as the cropping area is calculated according to the operation for designating the cropping area and the operation of selecting the aspect ratio in the operation information DR2. The in-screen position information TP (coordinate value of the image data PD within the frame) of the tracking target matches (or approaches) the coordinate value designated as the disposition position in the coordinate system inside the display frame 115 as the effective cropping area.

Thus, for example, when a face of the person who is a subject is set as the tracking target and an upper right position from a center of the screen is the disposition position of the tracking target as illustrated in FIG. 13B, the effective cropping area is set so that a position of the face is a position at the upper right from a center in each frame.

It is not always necessary for all or part of an area (for example, an area of a face image) indicated by the in-screen position information TP (a coordinate value in the frame of the image data PD) to strictly correspond to the tracking target disposition position. This is because the position of the face within the frame changes greatly for each frame, a pixel range (a size of the face on the screen) in which the face is imaged changes, or a face part is out of the frame and cannot follow. Alternatively, it is conceivable that matching with the target disposition position cannot be made due to the protrusion prevention processing to be described below. In that sense, the position of the tracking target (in-screen position information TP) may be as close as possible to the tracking target disposition position (a specific position inside the display frame 115) designated through the operation.

The image processing unit 32 performs the protrusion prevention processing in step ST18 on the requested cropping area CLrq set as described above, and sets a result of the protrusion prevention processing as the effective cropping area CL that is actually used in step S19.

In this protrusion prevention processing, the quaternion QD (#LN) or the coordinate transformation parameter HP for a plurality of previous and subsequent frames including such a frame are used.

For example, the requested cropping area CLrq serving as a candidate set in step ST17 can be used as it is in step S19, but then, a range corresponding to the inside of the display frame 115 exceeds a range of rotation and projection in the shake correction using the celestial sphere model MT and the shake correction may not function effectively, or an image loss may occur because a part of the image displayed by exceeding a pixel range of the image sensor 12a is lost.

Therefore, the protrusion prevention processing is performed to limit the cropping area so that a high-quality moving image can be output without causing such a problem.

The protrusion prevention processing is performed as a three-step processing including association with the imaged area illustrated in FIG. 19 (a first process), calculation of the movable area (hereinafter also referred to as an "available area") (a second process), and correction of the display range (a third process).

In FIG. 19, an imaged area (hereinafter also referred to as the "captured area") 61, the available area (movable area) 62, the requested cropping area CLrq, and the effective cropping area CL are shown.

The captured area (imaged area) 61 is an area in which an image is captured so that a subject can be displayed. That is, the capture area is a range in which the subject is imaged.

The available area (movable area) 62 is an area that allows cropping taking previous and subsequent frames into account. That is, the available area is a range in which the shake correction through the rotation of the shake correction celestial sphere model MT in step ST15 is effectively maintained.

The requested cropping area CLrq is an area to be displayed, which is determined according to the user operation or a tracking result.

The effective cropping area CL is an area obtained by moving the requested cropping area CLrq to be accommodated in the available area 62. This effective cropping area CL is an area that is actually cropped.

The first processing (processing of association with an imaging angle of view) in FIG. 19 is processing of setting the captured area 61 on the celestial sphere model MT, and the captured area 61 matches the imaged area.

Specifically, the processing is processing of allocating an imaged area to on the celestial sphere model MT in consideration of the angle of view or distortion of the lens using the coordinate transformation parameter HP.

For the area to be allocated, an area to which inverse correction using the coordinate transformation parameter HP has been applied is used.

Further, the captured area 61 illustrated in FIG. 19 is directed in a direction in which the shake is canceled on the celestial sphere model MT in order to apply the shake correction onto the celestial sphere model MT.

The second processing (the calculation of the movable area) is processing of calculating the available area 62 (movable area) of the current frame using information on the previous and subsequent frames.

The third processing (the correction of the display range) is processing of correcting the requested cropping area CLrq into the effective cropping area CL using the calculated available area 62.

When the effective cropping area CL is at least finally within the captured area 61 in which a subject exists, an image loss does not occur in a playback image or a display image. That is, when the cropping area does not protrude from the captured area 61, an image loss does not occur.

FIG. 20A illustrates a relationship between the captured area 61 and the cropping area 60 in frames #i, #i+1, and #i+2.

A subject range included (that is, captured) in the captured area 61 varies due to an influence of shake. Here, when the cropping area 60 of each frame is set so that the effective shake correction is maintained, for example, the cropping area 60 indicated by a broken line is formed in the frame #i+1 and an image loss occurs.

On the other hand, when the cropping area 60 is allowed to move over the entire captured area 61 so that an image loss does not occur, a corrected shake motion may appear directly. That is, the shake correction does not work effectively. For example, the cropping area 60 of the frame #i+1 is indicated by a solid line so that the image loss does not occur, but shake appears.

Therefore, the available area 62 is calculated as a range in which the shake correction can be effectively maintained, and the cropping area 60 is prevented from protruding from the available area 62 in the protrusion prevention.

Specifically, the available area 62 is set as a frame with a margin so that the cropping area 60 does not go to a portion that is likely to protrude in advance using shake information of previous and subsequent frames, and the cropping area 60 moves only in a range thereof.

Since the available area 62 has a meaning of a shake correction margin, the available area 62 is dynamically changed for each frame depending on a magnitude of the shake.

FIG. 20B illustrates a state in which the available area 62 is set within the captured area 61 in the frames #i, #i+1, and #i+2 so that the cropping area 60 does not protrude from the available area 62. In this case, the image loss does not occur, and the shake correction is also effectively maintained.

In the protrusion prevention processing, the requested cropping area CLrq is corrected for each frame so that the effective cropping area CL such as the cropping area 60 of FIG. 20B can be obtained.

An example in which the available area 62 is calculated will be described.

Figure 21A:
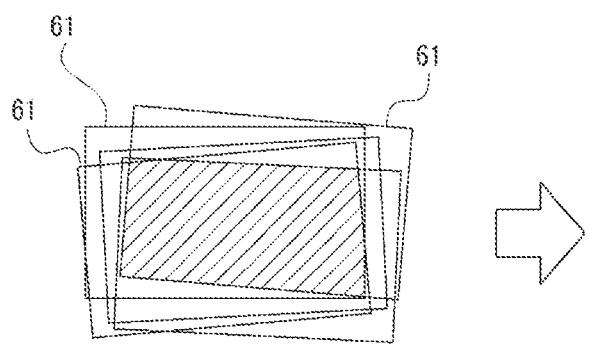
FIGS. 21A and 21B are illustrative diagrams of a method of creating an available area of the embodiment.
Figure 21B:
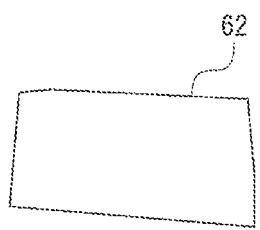

A first calculation scheme is illustrated in FIGS. 21A and 21B.

The available area 62 is set using respective captured areas 61 (imaged areas) of a plurality of consecutive frames including a frame as the processing target and frames at subsequent points in time in the time axis direction from the frame as the processing target. In this case, the available area 62 is a range commonly included in the captured areas 61 that are in a state in which the shake has been corrected in the respective frame of the plurality of frames.

FIG. 21A illustrates a superposition of captured areas 61 of a plurality of frames (from frame #i−m to frame #i+m) that are consecutive before and after a current frame when the current frame is frame #i.

The captured area 61 of each frame is associated with the celestial sphere model MT with the shake correction reflected therein. That is, for each frame, the imaging angle of view (captured area 61) is allocated onto the celestial sphere model MT in consideration of the angle of view or distortion of the lens using the coordinate transformation parameter HP, and rotation is performed using the quaternion QD (#LN). In FIG. 21A, the captured areas 61 that are associated with the celestial sphere model MT and directed in a direction in which the shake correction is canceled are overlapped and shown.

A range commonly included in the captured areas 61 of the plurality of frames, that is, a range in which an AND is taken is a range shaded in FIG. 21A, which is referred to as the available area 62 as illustrated in FIG. 21B.

Since the captured area 61 of each frame is moved by an amount of shake correction, the captured areas 61 of ±m frames before and after such a frame are overlapped and the AND is taken so that the common range is within the captured area 61. Therefore, this range is designated as the available area 62.

As a method of taking the AND, since the area is always a convex polygon, processing of taking intersection of two convex polygons may be repeated for the number of captured areas 61.

In order to reduce a degree of contribution of a frame that is farther from the current frame in time, the amount of shake correction applied to the captured area 61 may be decreased or a frame before the applied shake correction may be increased.

When the degree of contribution is not adjusted according to a time distance, a shape of the available area 62 changes discontinuously when a frame in which a large shake occurs is removed from a range of the ±m frame. On the other hand, it is possible to prevent the available area 62 from temporarily greatly varying by reducing the degree of contribution to the available area 62 for the captured area 61 of the frame far in time.

Further, although the captured area 61 in the range of ±m frames has been used, it is also conceivable to use the captured area 61 up to +m frames that are consecutive in a backward direction on the time axis.

A second calculation scheme will be described as an example in which the available area 62 is calculated with reference to FIGS. 22A, 22B, 22C, and 22D. This is an example in which the available area 62 is a range shown when a low-frequency variation component 61L of change in each end point of the captured area 61 for each of a plurality of frames is accommodated within the captured area 61 of each frame.

Specifically, this is a scheme for calculating the available area 62 on the basis of the quaternion QD to which a low-pass filter is applied.

FIG. 22A is represented in one dimension for simplification of illustration and description, but a solid line indicates a change in an upper end and a lower end of the captured area 61 in each frame. That is, this is a change for each frame due to shake.

A broken line indicates a low-frequency variation component 61L at the upper end and the lower end of the captured area 61 obtained by applying a low-pass filter.

An alternate long and short dash line indicates the upper end and the lower end as the available area 62.

Here, the available area 62 can be said as an area desiring that it is guaranteed that the available area 62 is inside the captured area 61 in a plurality of frames, but it cannot be guaranteed that the available area 62 is inside the captured area 61 only by applying a low-pass filter.

Therefore, the low-frequency variation component 61L of the captured area 61 is compensated with an amount protruding from the captured area 61 weighted with a temporal distance, thereby obtaining the available area 62 so that the available area 62 is smoothly accommodated inside the captured area 61.

In FIG. 22B, a part of FIG. 22A (the range of ±m frames) is enlarged, and a direction of weighting is indicated by an arrow.

FIG. 22C illustrates weighting causing the low-frequency variation component 61L to be accommodated in the captured area 61 in two dimensions.

An example of a specific calculation is as follows.

For each frame (#i), a quaternion (q_crcti) necessary to accommodate the low-frequency variation component 61L in the captured area 61 is obtained.

For $j \in [-m, m]$ $Wj = 1 - |j/m|$ $q\_crct\_smoothi = \max\{slerp(q\_crcti+j, q\_identity; Wj)\}$, and the quaternion q_crct_smoothi for smooth correction is obtained for all four end points (this equation is a max function for "j").

The quaternion q_crct_smoothi corresponds to a maximum weighting value indicated by an arrow in FIG. 22B.

Slerp is spherical linear interpolation, and q_identity is a unit quaternion.

This is calculated and applied for each end point of the low-frequency variation component 61L as illustrated in FIG. 22C.

The quaternion q_crct is obtained as an amount of rotation until collision with side of the captured area 61 occurs at the time of rotation in a direction toward a center of the captured area 61 for each end point of the low-frequency variation component 61L.

The available area 62 can be calculated using, for example, the first and second calculation schemes.

However, when the available area 62 is created using a motion of the previous and subsequent frames as in the above example, the available area 62 may become too small such that the requested cropping area CLrq is not accommodated when the motion is large.

Figure 23A:
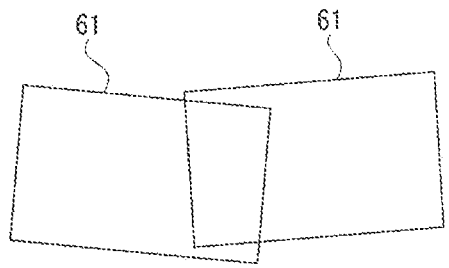
FIG. 23A, 23B, 23C, 23D, 23E, and 23F are illustrative diagrams of expansion of the available area of the embodiment.
Figure 23B:
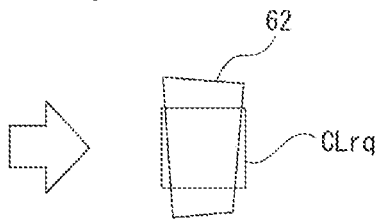

FIG. 23A illustrates a state in which the captured area 61 after the shake correction greatly deviates due to a violent motion between frames. In this case, the available area 62 becomes small as illustrated in FIG. 23B, and the requested cropping area CLrq cannot be accommodated.

Therefore, when a size or shape is such that the requested cropping area CLrq is not accommodated in the available area 62, the available area 62 is expanded so that the requested cropping area CLrq is accommodated.

Figure 23C:
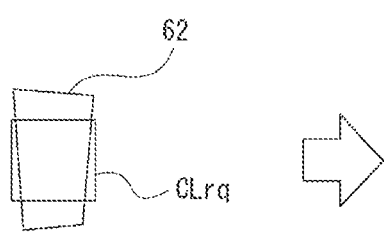

As a scheme therefor, the requested cropping area CLrq is aligned with a center of the available area 62, and the available area 62 is updated so that a protruding portion is accommodated, as illustrated in FIG. 23C. That is, the available area 62 is updated as illustrated in FIG. 23D.

Figure 23D:
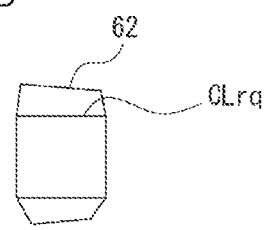

Specifically, a new convex polygon is created by a set of "vertices of the requested cropping area CLrq outside the available area 62" and "vertices of the available area 62 outside the requested cropping area CLrq" in a state of FIG. 23C, and set as an extended available area 62 of FIG. 23D.

Figure 23E:
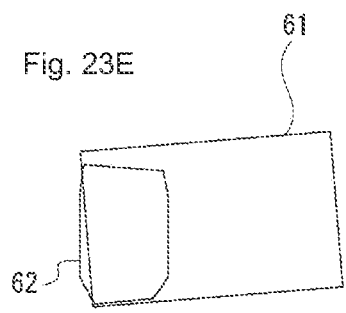
Figure 23F:
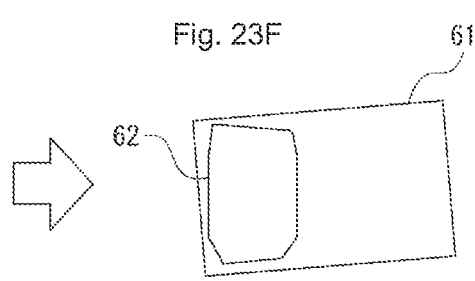

In this case, it cannot be guaranteed that the available area 62 is accommodated in the captured area 61 due to the expansion of the available area 62. For example, the available area 62 may protrude from the captured area 61, as illustrated in FIG. 23E.

Therefore, the available area 62 is moved so that the available area 62 is accommodated in the captured area 61, as illustrated in FIG. 23D.

The expansion of the available area 62 as described above is performed, making it possible to cope with a case of severe shake.

Next, the correction of the display range shown as the third processing in FIG. 19 will be described. That is, this is processing of correcting the requested cropping area CLrq so that the requested cropping area CLrq is accommodated in the calculated available area 62.

When the requested cropping area CLrq protrudes from the available area 62, the requested cropping area CLrq is moved, and movement directions include a yaw direction, a pitch direction, and a roll direction.

In this example, when the requested cropping area CLrq protrudes from the available area 62, correction of a yaw component and a pitch component is preferentially performed.

Figure 24C:
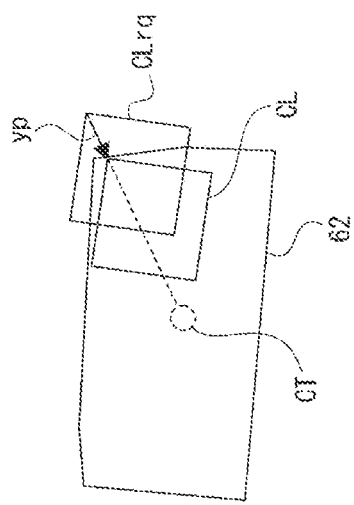
FIG. 24A, 24B, and 24C are illustrative diagrams of correction of a display range in protrusion prevention processing of the embodiment.
Figure 24B:
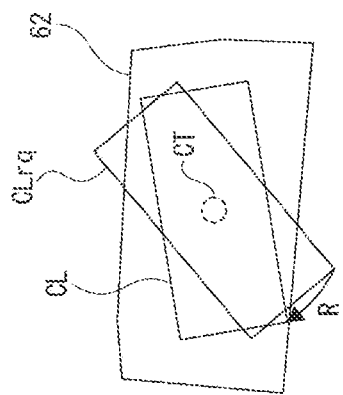
Figure 24A:
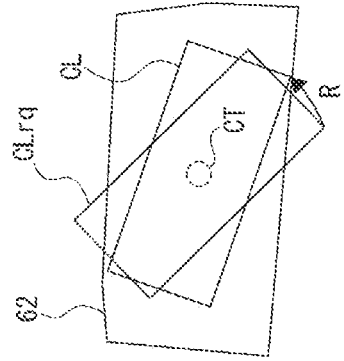

That is, as illustrated in FIG. 24A, the requested cropping area CLrq is moved toward a central CT of the available area 62 by a minimum necessary amount.

Here, the roll component is not changed, but is moved due to change in the yaw component and the pitch component (arrow yp).

When the requested cropping area CLrq is accommodated in the available area 62 due to this movement, correction of the display range is completed. That is, the moved requested cropping area CLrq is set as the effective cropping area CL.

On the other hand, depending on a shape or size of the available area 62, the requested cropping area CLrq may not be accommodated well in the available area 62 only by movement due to change in the yaw component and the pitch component.

In such a case, first, a center of the requested cropping area CLrq is made to overlap the center of the available area 62. The roll component is changed as illustrated in FIGS. 24B and 24C. In this case, the entire requested cropping area CLrq is rotated by a minimum amount of rotation required so that the requested cropping area CLrq is accommodated in the available area 62, as indicated by an arrow R in FIGS. 24A, 24B, and 24C. The requested cropping area CLrq that is in a state in which the requested cropping area CLrq is accommodated in the available area 62 is set as the effective cropping area CL.

Figure 25:
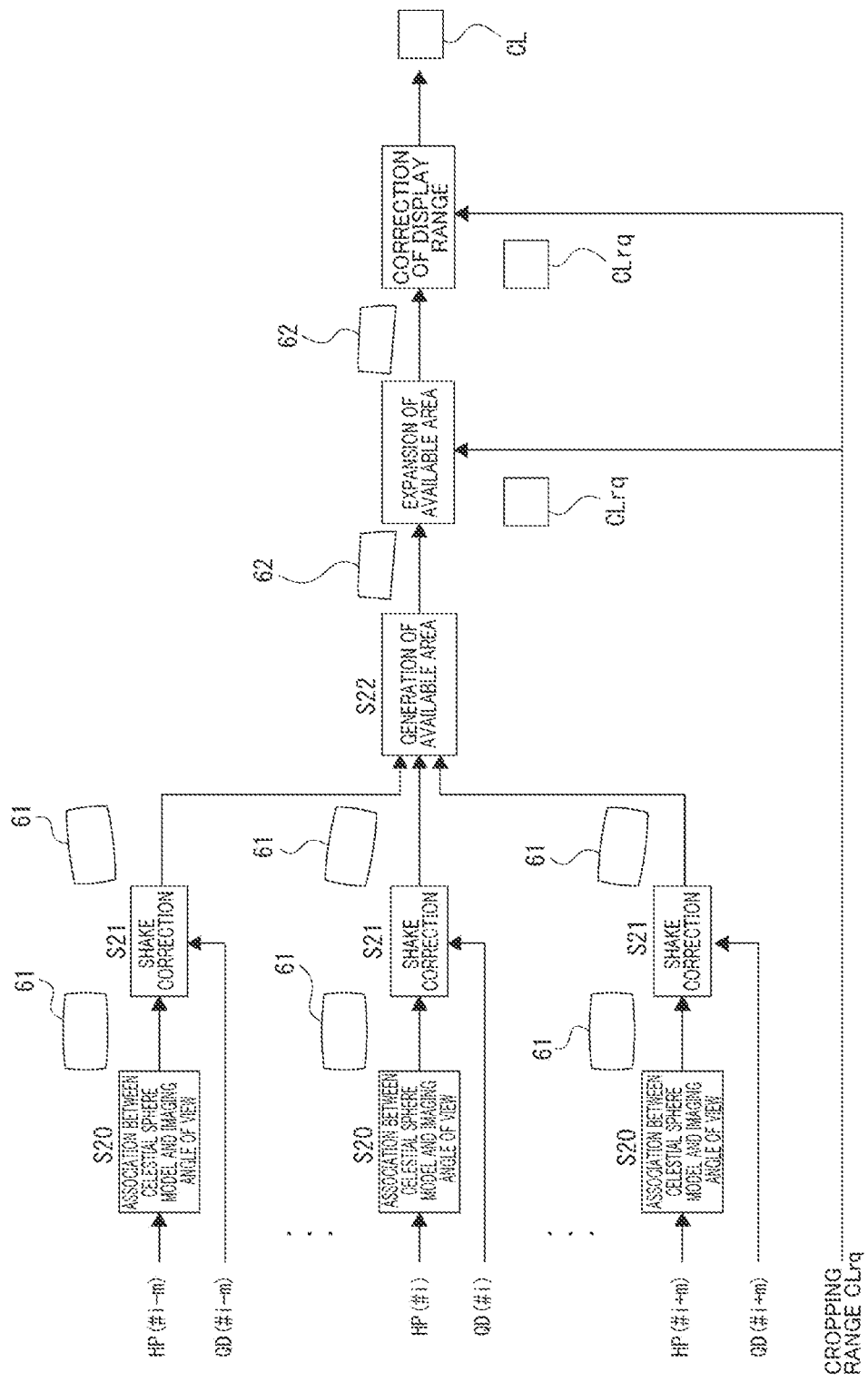
FIG. 25 is an illustrative diagram of a procedure for the protrusion prevention processing of the embodiment.

FIG. 25 illustrates an overall flow of the protrusion prevention processing.

In FIG. 25, m frames (frames #i−m to frame #i+m) before and after a current frame #i are shown.

For each frame, in step S20, the celestial sphere model MT and the imaging angle of view are associated with each other using a corresponding coordinate transformation parameter HP (HP(#i−m) . . . HP(#i+m)). Accordingly, the captured area 61 is expressed on the ideal celestial sphere.

Then, as step S21, the shake correction is performed using the corresponding quaternion QD (QD (#i−m) . . . QD (#i+m)).

For example, the quaternion QD (#i) corresponding to frame #i is the quaternion QD (LN) corresponding to each line in the frame #i.

In this step S21, the captured area 61 directed in a direction in which the shake is canceled is expressed on the celestial sphere model MT.

The available area 62 is generated in step S22 using the captured area 61 for each frame. The first calculation scheme, the second calculation scheme, and the like described above can be used.

The calculated available area 62 is expanded as necessary in step S23. That is, the requested cropping area CLrq determined by the requested cropping area CLrq and the available area 62 are compared with each other, and the above-described expansion processing is performed when the requested cropping area CLrq is not accommodated in the available area 62.

When the available area 62 is settled, the display range is corrected in step S24. That is, the requested cropping area CLrq is corrected and set as the effective cropping area CL, as described with reference to FIGS. 24A, 24B, and 24C. The effective cropping area CL is finally provided, as the cropping area CL corrected in the protrusion prevention processing, to the plane projection and cropping processing of step ST19 in FIG. 14.

In the protrusion prevention processing as illustrated in FIG. 25, dynamical change of the shake correction margin is realized by reflecting shake information of the previous and subsequent frames in the available area 62.

Further, the aspect ratio, cropping position, and size of the output image are expressed by the requested cropping area CLrq and the requested cropping area CLrq is accommodated in the available area 62, so that processing that considers the shake correction, cropping position, and the like at the same time is realized.

Although the above description has been made assuming the image file MF captured using a normal lens, the same processing can be applied to an image file MF captured using, for example, a fisheye lens.

However, in the case of a normal lens and a fisheye lens, an expression of the captured area 61 is different.

Figure 26B:
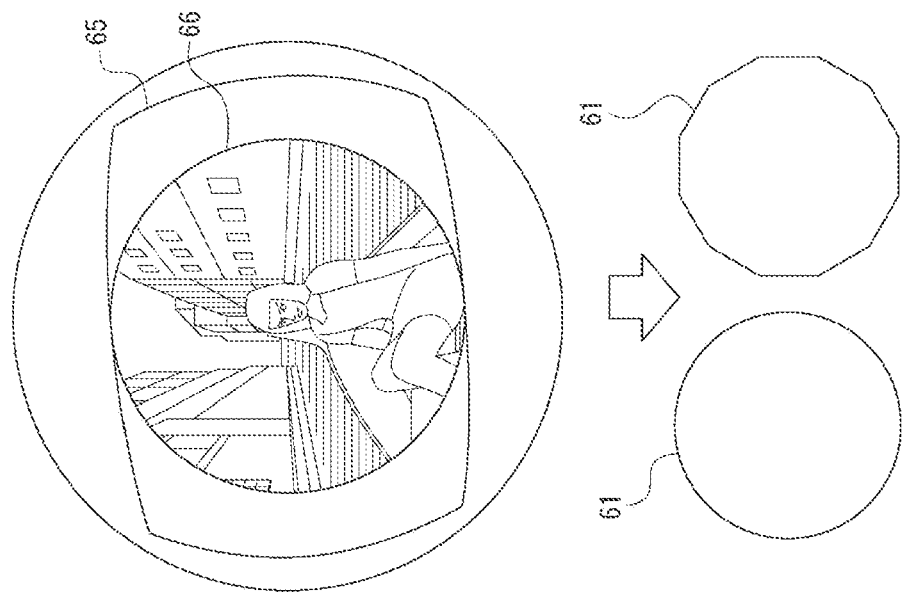
FIG. 26A and 26B are illustrative diagrams of a difference in a captured area depending on a lens of the embodiment.
Figure 26A:
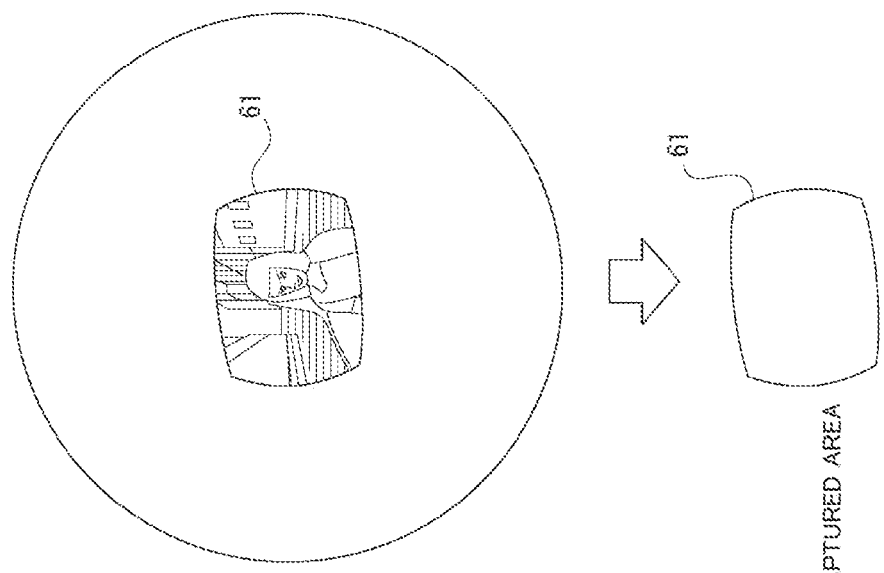

FIG. 26A illustrates expression on the celestial sphere model MT and a shape of the captured area 61 in the case of a normal lens, and FIG. 26B illustrates expression on the celestial sphere model MT and a shape of the captured area 61 in the case of a fisheye lens. In the case of imaging using a fisheye lens, a circular image formation area 66 is formed within an imaging pixel range 65 of the image sensor 12a, and thus, the captured area 61 is represented by a circle or a polygon as illustrated in FIGS. 26A and 26B.

5. Conclusion and Modification Examples

The following effects can be obtained the image processing in the above embodiment.

The image processing device of the embodiment includes the shake correction unit 33 that performs the shake correction using the posture information (the IMU data and the quaternion QD) corresponding to each frame on each of frames of image data constituting the moving image, which are the frames subjected to the processing of pasting to the celestial sphere model MT. Further, the image processing device includes the effective cropping area setting unit 34 that performs, on the requested cropping area CLrq, the protrusion prevention processing for performing correction so that the effective cropping area CL from each frame does not protrude from the movable area in which the effective shake correction is maintained, to thereby set the effective cropping area CL to be applied to each frame. Further, the image processing device includes the effective cropping area image generation processing unit 35 that performs the processing of generating the effective cropping area image that is an image projected from the celestial sphere model MT onto the plane model after the shake correction is performed by the shake correction unit 33, which is an image of the effective cropping area CL set by the effective cropping area setting unit 34.

That is, the shake caused by camera shake or the like in the image captured by the imaging device 1 is corrected through coordinate transformation on the celestial sphere model MT, and the effective cropping area CL of the image subjected to the shake correction and the plane projection is set.

Rotation taking the correction for the shake into account is performed on each frame on the celestial sphere model MT for the shake correction, such that a correction without trapezoidal distortion can be performed. Then, by obtaining a plane projection image according to the requested cropping area CLrq set through, for example, a user operation or some automatic control, the effective cropping area CL in which the requested cropping area CLrq has been reflected can be set, the shake correction can be performed, and the output image data oPD without trapezoidal distortion can be obtained. Further, it is possible to output a moving image in which the shake correction has been appropriately reflected, by performing the protrusion prevention processing.

Accordingly, a high-quality image with less shake or distortion after an output area suitable for the user and a request of automatic control is reflected in the original image file MF can be obtained.

In the embodiment, an example in which the image of the effective cropping area CL is cropped after the shake correction is performed in the celestial sphere model MT and the plane projection is made has been described, but the present technology is not limited thereto. That is, it is also possible to generate the image of the effective cropping area CL by cropping the image of the effective cropping area CL in a state in which the shake correction is performed in the celestial sphere model MT and projecting the image onto the plane.

Further, the shake correction unit 33 may perform at least the processing of step ST15 of FIG. 14, and some or all of steps ST11, ST12, ST13, and ST14 may be performed outside the function of the shake correction unit 33 (for example, a device different from the image processing device including the shake correction unit 33). Further, FIG. 8 illustrates a case in which the RAW data is an image processing target, but in this case, in the shake correction unit 33, the processing of canceling the internal correction of the imaging device in step ST12 is not necessary.

In the embodiment, an example in which the effective cropping area setting unit 34 sets the effective cropping area CL using the operation information (DR1 and DR2) based on the user operation has been given.

Accordingly, the shake correction is performed after a user's intention or an output area desired by the user is appropriately reflected, and the output image data oPD without trapezoidal distortion can be obtained.

In the embodiment, an example in which the effective cropping area setting unit 34 performs setting of the effective cropping area CL using the tracking target information regarding the tracking target has been given.

This makes the cropping area setting taking the tracking target into account possible.

Further, in the embodiment, an example in which the effective cropping area setting unit 34 sets the tracking target using the operation information DR1 based on the user operation has been given.

This makes the cropping area setting taking the subject (tracking target) that the user wants to pay attention into account possible. That is, it is possible to obtain an output image on which shake correction is appropriately performed while capturing a subject to be noticed.

Of course, processing when the tracking target is not designated is also assumed. For example, the user may not perform designation of the tracking target as described with reference to FIGS. 13A and 13B. In such a case, setting of the effective cropping area CL according to the operation described with reference to FIGS. 12A, 12B, and 12C may be performed.

Further, processing of automatically designating the tracking target regardless of a setting by the user may be performed. For example, this is processing of performing face detection and automatically setting a face as a tracking target when the face is detected.s In the embodiment, an example in which the tracking target is determined on the basis of the operation information DR1 for designating the tracking target, and the effective cropping area CL of each frame constituting the moving image is set according to the position in the image of the determined tracking target has been given.

That is, when the subject of the tracking target is designated by the operation of the user, the effective cropping area CL is set in consideration of the disposition of the tracking target in each frame.

This makes the cropping position setting possible so that the subject (tracking target) that the user wants to pay attention is not out of frame as the moving image progresses.

In the embodiment, an example in which the effective cropping area CL of each frame constituting the moving image is set by using the operation information DR2 for designating the disposition position of the tracking target in the screen has been given.

Accordingly, the user designates a place at which a subject (tracking target) to which the user wants to pay attention is displayed inside the screen, and the cropping area setting can be performed so that the tracking target is located at the disposition position (near the disposition position) inside the screen in each frame. Therefore, moving image processing in which the moving image progresses in a state in which the subject serving as the tracking target is near a disposition position desired by the user, such as a position from a center or the left side of the screen, is realized.

There may be a processing example in which the disposition position of the tracking target is not designated. For example, this is a processing example for preventing at least the tracking target from being out of frame.

Further, the tracking target disposition position may be automatically designated. For example, the tracking target disposition position is automatically set to a predetermined position such as the center of the screen or a position near the right. This makes the cropping area setting possible so that the tracking target can be captured at a predetermined position even when the user does not perform an operation for designating the tracking target disposition position.

In the embodiment, an example in which the operation information DR2 for designating the output area of the image is used for setting of the effective cropping area CL has been given.

For example, the area of the output image can be designated through a user operation on the framing screen 103 described with reference to FIGS. 12A, 12B, and 12C, and the operation information DR2 is used for setting of the effective cropping area CL.

This makes it possible to obtain an output image on which the shake correction has been appropriately performed while cropping the output area of the image arbitrarily designated by the user.

In the embodiment, an example in which the operation information DR2 for designating the aspect ratio of the image is used for setting of the effective cropping area CL has been given.

For example, the aspect ratio of the output image can be designated through an operation of the user on the aspect ratio setting screen 106, and the operation information DR2 is used for setting of the cropping area.

This makes it possible to obtain an output image having an aspect ratio arbitrarily designated by the user, on which the shake correction has been appropriately performed.

In the embodiment, an example in which the first processing of setting the requested cropping area CLrq at the coordinates of the celestial sphere model MT in which the shake correction unit 33 has performed the shake correction, the second processing of obtaining the movable area (available area 62) that allows a variation in the requested cropping area CLrq in the imaged area (captured area 61), and the third processing of setting the effective cropping area CL by correcting the requested cropping area CLrq so that the requested cropping area CLrq is accommodated in the movable area (available area 62) are performed as the protrusion prevention processing that is performed on each frame of the image data has been given.

Accordingly, the tracking target or the output area arbitrarily designated by the user, or the cropping area based on the aspect ratio or the like does not vary indefinitely depending on image content, or the like, but is corrected into a range in which the shake correction can be maintained appropriately. Therefore, it is possible to obtain the output image data oPD on which the shake correction has been appropriately performed, while reflecting various designations of the user. Further, in order for the shake correction to be able to be appropriately maintained, an imaged area (captured area 61) is set at the coordinates of the celestial sphere model MT in which the shake correction has been performed, a movable area (available area 62) is calculated in the imaged area, and the requested cropping area CLrq is corrected so that the requested cropping area CLrq is accommodated in the available area 62. The corrected requested cropping area CLrq is set as the final effective cropping area CL. That is, the cropping area is limited by the available area 62. This makes it possible to appropriately perform a cropping area setting in which the shake correction in the celestial sphere model MT is reflected.

In the second processing in the protrusion prevention processing of the embodiment, an example in which the available area 62 is set using respective captured areas 61 of the plurality of consecutive frames including the frame as the processing target and the frames at the subsequent points in time and the frames at the previous point in time in the time axis direction from the frame as the processing target has been described.

That is, the captured areas 61 of the plurality of consecutive frames is used as in the first calculation scheme of FIGS. 21A and 21B or the second calculation scheme of FIGS. 22A, 22B, 22C, and 22D, making it possible to detect the image range that is commonly included in the respective frames even when there is shake occurring in the time axis direction (between the frames) for a certain period of time. This is an area in which the image is not lost in a period of the plurality of frames and the shake correction is effective. This is referred to as the available area 62. Accordingly, the available area 62 is dynamically changed depending on the magnitude of the shake, so that the cropping area setting that does not cause an image loss due to the shake and can also maintain the shake correction on the moving image based on the output image data oPD is realized. Therefore, it is possible to easily create a high-quality moving image.

The available area 62 can also be set using respective captured areas 61 of the plurality of consecutive frames including the frame as the processing target and the frames at subsequent points in time in the time axis direction from the frame as the processing target.

Further, the available area 62 can also be set using respective captured areas 61 of the plurality of consecutive frames including the frame as the processing target and the frame at a previous point in time in the time axis direction from the frame as the processing target.

In the embodiment, an example in which the available area 62 is the range that is commonly included in the captured areas 61 that is in a state in which the shake correction for each of the plurality of frames has been performed has been given.

That is, it is possible to set the available area 62 that is a range in which no image loss occurs even when a cropping frame is set, by using the captured area 61 that is in a state in which the shake correction has been performed on the plurality of consecutive frames, as described as the first calculation scheme in FIGS. 21A and 21B. Since this is a range common to the captured areas 61 that are in a state in which the shake correction has been performed, the shake correction is also in an effective range.

Further, in this case, the captured area 61 may be used as it is, but the degree of contribution is adjusted depending on the time distance by changing a degree of the shake correction of the captured area 61 depending on a distance from the current frame, making it possible to mitigate an influence of, for example, large shake at a distant point in time and smooth a change in the available area 62. This does not cause a state in which the angle of view changes suddenly in the playback moving image.

In the embodiment, an example in which the available area 62 is the range shown when the low-frequency variation component 61L of the change in each end point of the captured area 61 for each of the plurality of frames is accommodated in the captured area 61 of each frame has been given.

That is, this is an example described as the second calculation scheme in FIGS. 22A, 22B, 22C, and 22D.

The available area 62 of each frame is set using the low-frequency variation component 61L of the change in each end point of the captured area 61, making it possible to smooth the change of the available area 62 in the time axis direction and obtain a moving image in which the change of the cropping area does not suddenly occur.

However, since it is not possible to compensate for the fact that the image loss does not occur (that is, the cropping area is within the captured area 61) simply by using the low-frequency variation component 61L, a position of each end point defined by the low-frequency variation component 61L is corrected so that the cropping area is accommodated in the captured area 61 for each frame. This makes it possible to obtain a moving image in which an image loss does not occur and a change in the cropping area is smooth.

The third processing in the protrusion prevention processing of the embodiment is performed by moving the requested cropping area CLrq toward the center of the available area 62 without rotating the requested cropping area CLrq until the requested cropping area CLrq is accommodated in the available area 62.

That is, as the correction of the display range, the requested cropping area CLrq is moved without being rotated by a necessary distance until the requested cropping area CLrq is accommodated in the available area 62, as described in FIGS. 24A, 24B, and 24C. Accordingly, the tracking target or the output area arbitrarily designated by the user, or the cropping area based on the aspect ratio or the like is moved into the available area 62 not to cause rotation as much as possible, thereby preventing the image from rotating unnecessarily on the moving image that is played back.

Further, in the third processing of the embodiment, when the requested cropping area CLrq is not accommodated in the available area 62 by movement of the requested cropping area CLrq toward the center of the available area 62 without rotation of the requested cropping area CLrq, the requested cropping area CLrq is rotated so that the requested cropping area CLrq is accommodated in the available area 62.

That is, the requested cropping area CLrq is rotated only when the requested cropping area CLrq is not accommodated in the available area 62 in a state in which the requested cropping area CLrq is not rotated. Thus, the rotation is performed only when the rotation is unavoidable as correction of the cropping area, so that the image loss is prevented as much as possible.

In the embodiment, the shake correction unit 33 acquires the posture information (quaternion QD) corresponding to each frame on the basis of the metadata generated at the time of capturing the image data (image file MF) that is a processing target, and uses the posture information for the shake correction. The quaternion QD, which is the posture information of the imaging device, is calculated from the IMU data added as the metadata. The shake correction on the celestial sphere model MT is performed using the quaternion QD, making it possible to perform appropriate shake correction according to a situation at the time of imaging. In particular, in the case of the embodiment, since the internal correction of the camera performed at the time of imaging is canceled, reflecting the posture of the imaging device 1 at the time of imaging as it is enables optimum shake correction.

In the embodiment, an example in which the shake correction is performed on each frame of the image data using the posture information (quaternion QD (LN)) acquired on the basis of the timing of the exposure centroid for each line has been given (see step SST14 in FIG. 14).

Relative shake between the subject and the imaging device in the exposure period causes so-called blur, which becomes more noticeable when the exposure time becomes longer depending on the shutter speed. In this case, when posture information at an exposure start timing of each line is used, relative shake in the exposure period of each line becomes shake in one direction when viewed from the posture information, and becomes more noticeable on the image.

On the other hand, when the posture information is acquired on the basis of the IMU data at the centroid position in the exposure period of each line as illustrated in FIG. 16, relative shake in the exposure period becomes bidirectional shake when viewed from a state of the posture information, and visually, the shake seems to be offset in a time direction so that the blur is less noticeable in the image.

In the embodiment, the shake correction unit 33 performs correction cancellation processing on the image data that is a processing target using the metadata associated with the image data, and performs the processing of pasting to the celestial sphere model MT in a state in which return to a state before the correction processing, which has already been performed, is performed has occurred (see step SST12 in FIG. 14).

For example, in the imaging device 1, the correction processing such as image stabilization is performed at the time of imaging, but the correction that has already been performed is cancelled and then the shake correction is performed on the image data that is a processing target.

Accordingly, appropriate shake correction can be performed on original captured image data, for example, image data that is in a state of being taken out from the imaging element unit 12, without being affected by the correction at the time of imaging. That is, high-quality shake correction can be realized according to processing capacity of the image processing device without being affected by, for example, performance of the imaging device 1 that has performed imaging.

In the embodiment, the shake correction unit 33 performs the correction cancellation using the coordinate transformation parameter HP associated with each frame of the image data as metadata.

The coordinate transformation parameter HP is information in a case in which an image frame (an image range including the angle of view) of the captured image is changed, such as respective parameters of lens distortion, trapezoidal distortion, focal plane distortion, electrical image stabilization, and optical image stabilization. This makes it possible to cancel the correction regarding the image frame at the time of imaging, and to perform return to an original state when the image frame (range of the image) is corrected by the imaging device 1.

The image processing device of the embodiment includes the preprocessing unit 31 that extracts and stores the metadata corresponding to each frame of the image data with respect to the image file MF including the image data constituting the moving image and the corresponding metadata.

Accordingly, the metadata for each frame can be used in the processing of the shake correction unit 33 or the processing of the effective cropping area setting unit 34.

The processing of steps ST1 to ST4 is illustrated in FIG. 14 as the processing using the function of the preprocessing unit 31 of the image processing device of the embodiment, but the present technology is not limited thereto. The preprocessing unit 31 may perform at least processing of calculating the posture information according to the metadata (for example, step ST4), and holding of the metadata (for example, step ST3).

Further, the processing of steps ST11 to ST19 is illustrated in FIG. 14 as the processing using functions of the image processing unit 32, but the present technology is not limited thereto. For example, the processing of step ST11 may be performed externally, and in that case, the image processing unit 32 may perform the processing of steps ST12 to ST19.

Further, the image processing unit 32 may not perform the processing of canceling the correction inside the imaging device in step ST12.

Further, it is also conceivable that the image processing unit 32 does not perform processing regarding the tracking in step ST16.

Further, it is also conceivable that the image processing unit 32 does not perform the synchronization processing of step ST14.

At least, the image processing device of the present disclosure may perform steps ST13 (pasting to the celestial sphere model MT), step ST15 (shake correction), step ST17 (output area designation), step ST18 (protrusion prevention processing), and step ST19 (plane projection and cropping) as the processing of the image processing unit 32.

A technology described in the embodiment can be applied to the following cases of respective examples as image stabilization in the imaging device 1. Optical image stabilization referred to hereinafter is correction of shake of an inter-frame component. Further, the electrical image stabilization also includes a case of only focal plane correction.

Case in which optical image stabilization is performed and the electrical image stabilization is not performed Case in which neither optical image stabilization nor the electrical image stabilization is performed Case in which optical image stabilization is not performed and the electrical image stabilization is performed.

Case in which both optical image stabilization and the electrical image stabilization are performed The processing of the image processing device of the embodiment can be applied to the image captured by the imaging device 1 in each of these cases.

A program of the embodiment is a program for causing, for example, a CPU, a DSP, or a device including these to execute the processing illustrated in FIG. 14 or 25. That is, the program of the embodiment is a program causing the information processing device to execute processing for performing processing of pasting to the celestial sphere model MT for each frame of the image data constituting the moving image and performing the shake correction using the posture information corresponding to the frame, processing for setting the cropping area of the image based on the operation information and then performing the protrusion prevention processing for correcting the cropping area so that the cropping area does not protrude from the area in which the effective shake correction is maintained to designate the cropping area, and processing of cropping an image in the designated cropping area with respect to an image projected onto the plane in a state in which the shake correction has been performed. With such a program, the mentioned image processing device described can be realized in a device such as the mobile terminal 2, the personal computer 3, or the imaging device 1.

Such a program can be recorded in advance in an HDD as a recording medium built in a device such as a computer device, a ROM in a microcomputer including a CPU, or the like.

Alternatively, the program can be temporarily or permanently stored (recorded) in a removable recording medium such as a flexible disc, a compact disc read only memory (CD-ROM), a magnet optical (MO) disc, a digital versatile disc (DVD), a Blu-ray disc (registered trademark), a magnetic disk, a semiconductor memory, or a memory card. Such a removable recording medium can be provided as so-called package software.

Further, such a program can be installed in a personal computer or the like from the removable recording medium, and can also be downloaded from a download site via a network such as a local area network (LAN) or the Internet.

Further, such a program is suitable for a wide range of provision of the image processing device of the embodiment. For example, a program is downloaded to a personal computer, a portable information processing device, a mobile phone, a game device, a video device, a personal digital assistant (PDA), or the like, making it possible for the personal computer or the like to function as the image processing device of the present disclosure.

The effects described in the present specification are merely examples and are not limited, and other effects may be obtained.

The present technology can also adopt the following configurations.

(1)

An image processing device including;

a shake correction unit configured to perform shake correction using posture information corresponding to each frame of image data constituting a moving image on each frame, the frame having been subjected to processing of pasting to a celestial sphere model;

an effective cropping area setting unit configured to perform protrusion prevention processing for correcting an effective cropping area from each frame so that the effective cropping area does not protrude from a movable area in which the effective shake correction is maintained, on a requested cropping area, to set an effective cropping area applied to each frame; and an effective cropping area image generation processing unit configured to perform processing for generating an effective cropping area image, the effective cropping area image being an image subjected to the shake correction by the shake correction unit and then projected onto a plane model from the celestial sphere model and being an image of the effective cropping area set by the effective cropping area setting unit.

(2)

The image processing device according to (1), wherein the effective cropping area setting unit sets the effective cropping area using operation information based on a user operation.

(3)

The image processing device according to (1) or (2), wherein the effective cropping area setting unit sets the effective cropping area using tracking target information regarding a tracking target.

(4)

The image processing device according to (3), wherein the effective cropping area setting unit sets the tracking target using operation information based on a user operation.

(5)

The image processing device according to (3) or (4), wherein the effective cropping area setting unit sets the effective cropping area using operation information for designating a disposition position within a screen of the tracking target.

(6)

The image processing device according to any one of (1) to (5), wherein the effective cropping area setting unit uses operation information for designating an output area of the image, for setting of the effective cropping area.

(7)

The image processing device according to any one of (1) to (6), wherein the effective cropping area setting unit uses operation information for designating an aspect ratio of the image, for setting of the effective cropping area.

(8)

The image processing device according to any one of (1) to (7), wherein the effective cropping area setting unit performs, as protrusion prevention processing performed on each frame of the image data, first processing of setting the requested cropping area on coordinates of the celestial sphere model in which the shake correction unit has performed the shake correction; and second processing of obtaining a movable area in which variation in the requested cropping area is allowed within an imaging area, and third processing of correcting the requested cropping area so that the requested cropping area is accommodated within the movable area to set the effective cropping area.

(9)

The image processing device according to (8), wherein in the second processing, the movable area is set using each imaging area of a plurality of consecutive frames including a frame as a processing target and a frame at a subsequent point in a time in a time axis direction from the frame as a processing target, the frame as the processing target and a frame at a previous point in a time in the time axis direction from the frame as a processing target, or the frame as the processing target and the frames at the subsequent and previous points in a time in the time axis direction from the frame as a processing target.

(10)

The image processing device according to (9), wherein the movable area is a range commonly included in imaging areas in which the shake correction has been performed on each of the plurality of frames.

(11)

The image processing device according to (9), wherein the movable area is a range shown when a low-frequency variation component of change in each end point of the imaging area for each of the plurality of frames is accommodated within the imaging area of each frame.

(12)

The image processing device according to any one of (8) to (11), wherein the third processing is performed by moving the requested cropping area toward a center of the movable area without rotating the requested cropping area until the requested cropping area is accommodated in the movable area.

(13)

The image processing device according to (12), wherein, in the third processing, when the requested cropping area cannot be accommodated in the movable area due to movement of the requested cropping area toward the center of the movable area without rotation of the requested cropping area, the requested cropping area is rotated so that the requested cropping area is accommodated in the movable area.

(14)

The image processing device according to any one of (1) to (13), wherein the shake correction unit acquires the posture information corresponding to each frame on the basis of metadata generated at the time of capturing the image data as a processing target, and uses the posture information for shake correction.

(15)

The image processing device according to any one of (1) to (14), wherein the shake correction unit performs shake correction on each frame of the image data using the posture information acquired on the basis of a timing of an exposure centroid for each line.

(16)

The image processing device according to any one of (1) to (15), wherein the shake correction unit performs correction cancellation processing on image data as a processing target using metadata associated with the image data, and performs the processing of pasting to the celestial sphere model in a state in which return to a state before correction processing that has been already performed is performed has occurred.

(17)

The image processing device according to (16), wherein the shake correction unit performs correction cancellation using a coordinate transformation parameter associated with each frame of the image data as metadata.

(18)

The image processing device according to any one of (1) to (17), including a pre-processing unit configured to extract and store metadata corresponding to each frame of the image data with respect to an image file including the image data constituting the moving image and corresponding metadata.

(19)

An image processing method including:

performing, by an image processing device, processing of performing shake correction using posture information corresponding to each frame of image data constituting a moving image on each frame, the frame having been subjected to processing of pasting to a celestial sphere model;

performing protrusion prevention processing for correcting an effective cropping area from each frame so that the effective cropping area does not protrude from a movable area in which the effective shake correction is maintained, on a requested cropping area, to set an effective cropping area applied to each frame; and generating an effective cropping area image, the effective cropping area image being an image subjected to the shake correction and then projected onto a plane model from the celestial sphere model and being an image of the set effective cropping area.

(20)

A program causing an information processing device to execute:

processing of performing shake correction using posture information corresponding to each frame of image data constituting a moving image on each frame, the frame having been subjected to processing of pasting to a celestial sphere model;

processing of performing protrusion prevention processing for correcting an effective cropping area from each frame so that the effective cropping area does not protrude from a movable area in which the effective shake correction is maintained, on a requested cropping area, to set an effective cropping area applied to each frame; and processing of generating an effective cropping area image, the effective cropping area image being an image subjected to the shake correction and then projected onto a plane model from the celestial sphere model and being an image of the set effective cropping area.

REFERENCE SIGNS LIST

1 Imaging device
2 Mobile terminal
3 Personal computer
4 Server
5 Storage medium
11 Lens system
12 Imaging element unit
13 Camera signal processing unit
14 Recording unit
15 Display unit
16 Output unit
17 Operation unit
18 Camera control unit
19 Memory unit
22 Driver unit
23 Sensor unit
31 Preprocessing unit
32 Image processing unit
33 Shake correction unit 34 Effective cropping area setting unit
35 Effective cropping area image generation processing unit
36 UI Processing Unit
61 Captured area
62 Available area
70 Information processing device
71 CPU
101 Import screen
102 Preview screen
103 Framing screen
104 Trimming screen
105 Speed screen
106 Aspect ratio Setting screen
107 Setting screen
108 Export screen
MF Image file
PD, iPD Image data
oPD Output image data
HP Coordinate transformation parameter
TM Timing information
CP Camera parameter
QD Quaternion
TP, TPp In-screen position information
DR1, DR2 Operation information
CL Effective cropping area
CLrq Requested cropping area
MT Celestial sphere model

The invention claimed is:

1. An image processing device comprising: a shake correction unit configured to perform shake correction using posture information corresponding to each of the frames of image data constituting a moving image on each frame, the frame having been subjected to processing of pasting to a celestial sphere model; an effective cropping area setting unit configured to set an effective cropping area applied to each frame by performing protrusion prevention processing, on a requested cropping area, for correcting an effective cropping area from each frame so that the effective cropping area does not protrude from a movable area in which the shake correction is maintained; and an effective cropping area image generation processing unit configured to perform processing for generating an effective cropping area image, the effective cropping area image being an image subjected to the shake correction by the shake correction unit and then projected onto a plane model from the celestial sphere model and being an image of the effective cropping area set by the effective cropping area setting unit.

2. The image processing device according to claim 1, wherein the effective cropping area setting unit sets the effective cropping area using operation information based on a user operation.

3. The image processing device according to claim 1, wherein the effective cropping area setting unit sets the effective cropping area using tracking target information regarding a tracking target.

4. The image processing device according to claim 3, wherein the effective cropping area setting unit sets the tracking target using operation information based on a user operation.

5. The image processing device according to claim 3, wherein the effective cropping area setting unit sets the effective cropping area using operation information for designating a disposition position within a screen of the tracking target.

6. The image processing device according to claim 1, wherein the effective cropping area setting unit uses operation information for designating an output area of the image, for setting of the effective cropping area.

7. The image processing device according to claim 1, wherein the effective cropping area setting unit uses operation information for designating an aspect ratio of the image, for setting of the effective cropping area.

8. The image processing device according to claim 1,
wherein the effective cropping area setting unit performs, as protrusion prevention processing performed on each frame of the image data;
first processing of setting the requested cropping area on coordinates of the celestial sphere model in which the shake correction unit has performed the shake correction;
second processing of obtaining a movable area in which variation in the requested cropping area is allowed within an imaging area; and
third processing of correcting the requested cropping area so that the requested cropping area is accommodated within the movable area to set the effective cropping area.

9. The image processing device according to claim 8,
wherein in the second processing, the movable area is set using each imaging area of a plurality of consecutive frames including
a frame as a processing target and a frame at a subsequent point in a time in a time axis direction from the frame as a processing target,
the frame as the processing target and a frame at a previous point in a time in the time axis direction from the frame as a processing target, or
the frame as the processing target and the frames at the subsequent and previous points in a time in the time axis direction from the frame as a processing target.

10. The image processing device according to claim 9, wherein the movable area is a range commonly included in imaging areas in which the shake correction has been performed on each of the plurality of frames.

11. The image processing device according to claim 9, wherein the movable area is a range shown when a low-frequency variation component of change in each end point of the imaging area for each of the plurality of frames is accommodated within the imaging area of each frame.

12. The image processing device according to claim 8, wherein the third processing is performed by moving the requested cropping area toward a center of the movable area without rotating the requested cropping area until the requested cropping area is accommodated in the movable area.

13. The image processing device according to claim 12, wherein, in the third processing, when the requested cropping area cannot be accommodated in the movable area due to movement of the requested cropping area toward the center of the movable area without rotation of the requested cropping area, the requested cropping area is rotated so that the requested cropping area is accommodated in the movable area.

14. The image processing device according to claim 1, wherein the shake correction unit acquires the posture information corresponding to each frame on the basis of metadata generated at the time of capturing the image data as a processing target, and uses the posture information for shake correction.

15. The image processing device according to claim 1, wherein the shake correction unit performs shake correction on each frame of the image data using the posture information acquired on the basis of a timing of an exposure centroid for each line.

16. The image processing device according to claim 1, wherein the shake correction unit performs correction cancellation processing on image data as a processing target using metadata associated with the image data, and performs the processing of pasting to the celestial sphere model in a state in which return to a state before correction processing that has been already performed is performed has occurred.

17. The image processing device according to claim 16, wherein the shake correction unit performs correction cancellation using a coordinate transformation parameter associated with each frame of the image data as metadata.

18. The image processing device according to claim 1, wherein the image processing device includes a pre-processing unit configured to extract and store metadata corresponding to each frame of the image data with respect to an image file including the image data constituting the moving image and corresponding metadata.

19. An image processing method comprising: performing, by an image processing device, processing of performing shake correction using posture information corresponding to each frame of image data constituting a moving image on each frame, the frame having been subjected to processing of pasting to a celestial sphere model; performing protrusion prevention processing for correcting an effective cropping area from each frame so that the effective cropping area does not protrude from a movable area in which the shake correction is maintained, on a requested cropping area, to set an effective cropping area applied to each frame; and generating an effective cropping area image, the effective cropping area image being an image subjected to the shake correction and then projected onto a plane model from the celestial sphere model and being an image of the set effective cropping area.

20. A non-transitory computer readable medium storing a program causing an information processing device to execute: processing of performing shake correction using posture information corresponding to each frame of image data constituting a moving image on each frame, the frame having been subjected to processing of pasting to a celestial sphere model; processing of performing protrusion prevention processing for correcting an effective cropping area from each frame so that the effective cropping area does not protrude from a movable area in which the shake correction is maintained, on a requested cropping area, to set an effective cropping area applied to each frame; and processing of generating an effective cropping area image, the effective cropping area image being an image subjected to the shake correction and then projected onto a plane model from the celestial sphere model and being an image of the set effective cropping area.

* * * * *